United States Patent [19]

Schultz et al.

[11] Patent Number: 5,410,405
[45] Date of Patent: Apr. 25, 1995

[54] METHOD AND APPARATUS FOR MEASURING SURFACE MOVEMENT OF A SOLID OBJECT THAT IS SUBJECTED TO EXTERNAL VIBRATIONS

[75] Inventors: Thomas J. Schultz, Maumee, Ohio; Petros A. Kotidis, Waban, Mass.; Jaime A. Woodroffe, North Reading, Mass.; Peter S. Rostler, Newton, Mass.

[73] Assignee: Textron Defense Systems, Division of Avco Corp., Wilmington, Mass.

[21] Appl. No.: 160,279

[22] Filed: Dec. 2, 1993

Related U.S. Application Data

[62] Division of Ser. No. 785,787, Oct. 31, 1991, Pat. No. 5,286,313.

[51] Int. Cl.⁶ .............................................. G01B 9/02
[52] U.S. Cl. .................................. 356/351; 356/357; 356/432
[58] Field of Search ............... 356/349, 351, 357, 358, 356/432 T; 73/655, 657; 250/572

[56] References Cited

U.S. PATENT DOCUMENTS

| | | | |
|---|---|---|---|
| 3,601,490 | 8/1971 | Erickson | 356/351 |
| 3,694,088 | 9/1972 | Gallagher et al. | 356/351 |
| 3,978,713 | 9/1976 | Penney . | |
| 4,144,767 | 3/1979 | Kaule et al. . | |
| 4,201,473 | 5/1980 | Domenicali et al. . | |
| 4,225,240 | 9/1980 | Balasubramanian . | |
| 4,255,971 | 3/1981 | Rosenewaig . | |
| 4,468,551 | 8/1984 | Neiheisel . | |
| 4,469,450 | 9/1984 | DiVincenzo . | |
| 4,522,510 | 6/1985 | Rosenewaig et al. . | |
| 4,539,846 | 9/1985 | Grossman . | |
| 4,541,280 | 9/1985 | Cielo et al. . | |
| 4,622,202 | 11/1986 | Yamada et al. . | |
| 4,633,715 | 1/1987 | Monchalin | 356/358 |
| 4,655,608 | 4/1987 | Goss et al. . | |
| 4,659,224 | 4/1987 | Monchalin . | |
| 4,762,425 | 8/1988 | Shakkottai et al. . | |
| 4,966,459 | 10/1990 | Monchalin . | |
| 5,052,661 | 10/1991 | Dunlay et al. . | |
| 5,080,491 | 1/1992 | Monchalin . | |
| 5,136,172 | 8/1992 | Nakata et al. | 356/432 T |
| 5,137,361 | 8/1992 | Heon et al. . | |

FOREIGN PATENT DOCUMENTS

| | | |
|---|---|---|
| 60-262926 | 8/1984 | Japan . |
| 1227064 | 3/1971 | United Kingdom . |

OTHER PUBLICATIONS

P. 61 of the Apr. 1991 issue of NASA Tech Briefs.
"New Sensors for Ultrasound: Measuring Temperature Probe Files;" appearing in *Materials & Standards*, vol. 10, No. 8 (Aug., 1970).

(List continued on next page.)

*Primary Examiner*—Samuel A. Turner
*Attorney, Agent, or Firm*—Perman & Green

[57] ABSTRACT

A system for non-destructively measuring an object and controlling industrial processes in response to the measurement is disclosed in which an impulse laser generates a plurality of sound waves over timed increments in an object. A polarizing interferometer is used to measure surface movement of the object caused by the sound waves and sensed by phase shifts in the signal beam. A photon multiplier senses the phase shift and develops an electrical signal. A signal conditioning arrangement modifies the electrical signals to generate an average signal correlated to the sound waves which in turn is correlated to a physical or metallurgical property of the object, such as temperature, which property may then be used to control the process. External, random vibrations of the workpiece are utilized to develop discernible signals which can be sensed in the interferometer by only one photon multiplier. In addition the interferometer includes an arrangement for optimizing its sensitivity so that movement attributed to various waves can be detected in opaque objects. The interferometer also includes a mechanism for sensing objects with rough surfaces which produce speckle light patterns. Finally the interferometer per se, with the addition of a second photon multiplier is capable of accurately recording beam length distance differences with only one reading.

22 Claims, 11 Drawing Sheets

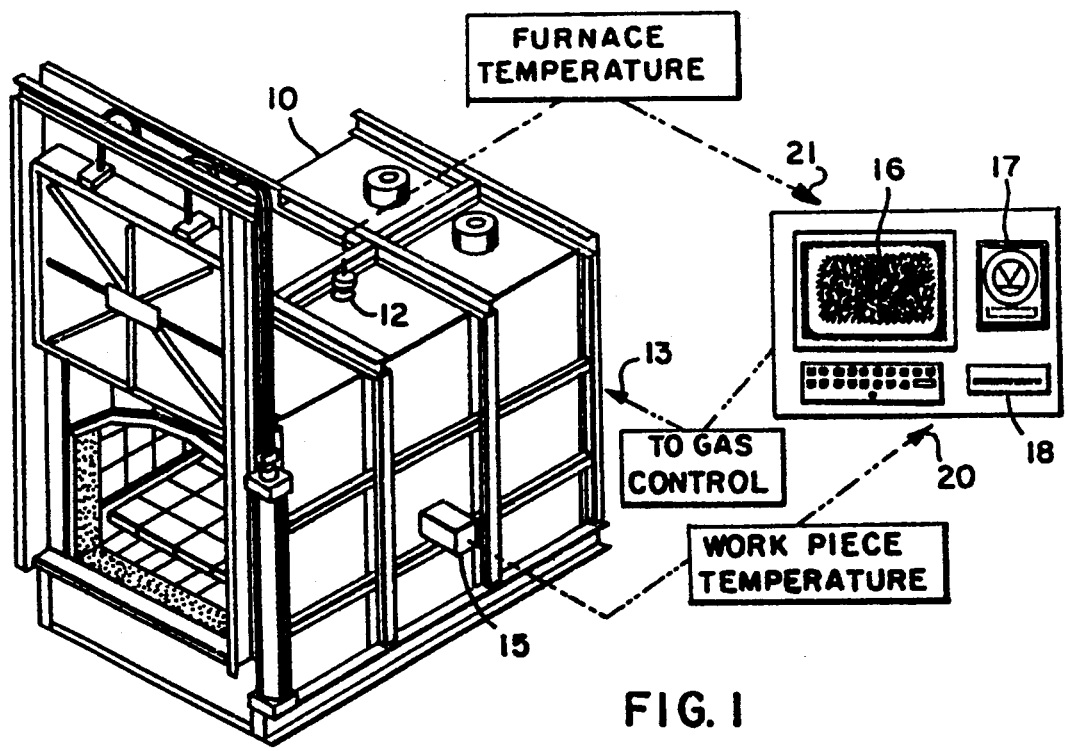
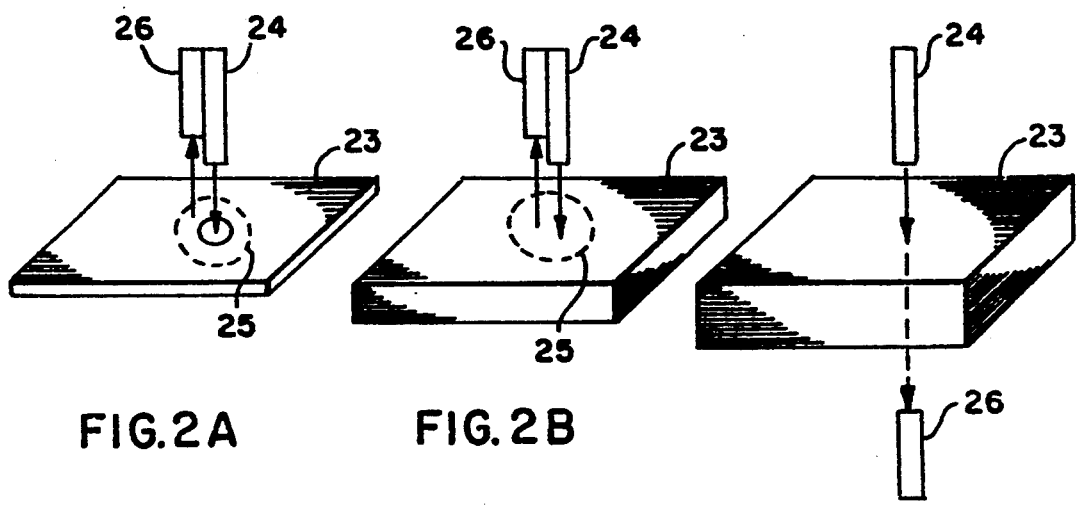

(a) UNPROCESSED SIGNAL

WAVE ARRIVAL (b) PROCESSED SIGNAL

WAVE ARRIVAL (a) UNPROCESSED SIGNAL

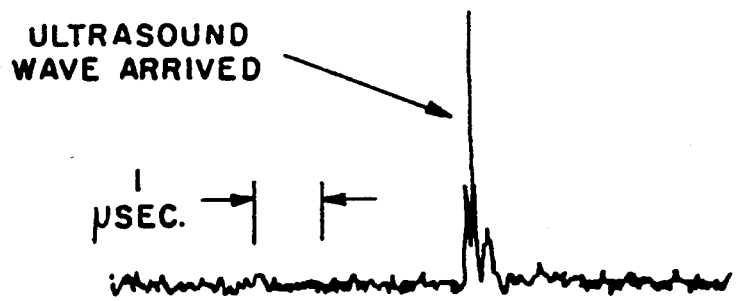
(b) PROCESSED SIGNAL
FIG. 15b
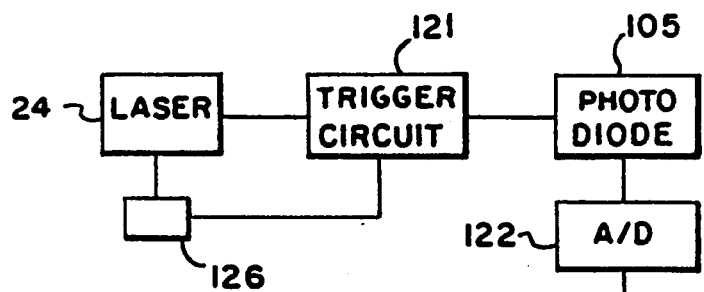
FIG. 16e
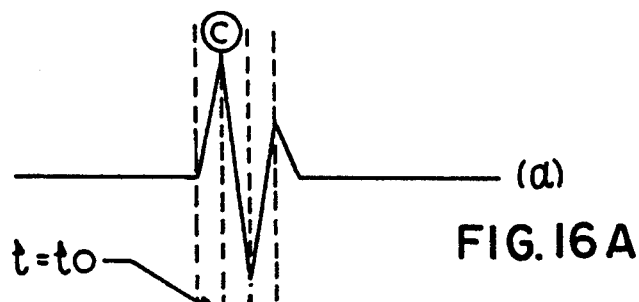
(a) FIG. 16A
(b) FIG. 16b
(c) SIMPLE AVERAGING FIG. 16c
(d) SQUARED AVERAGING FIG. 16d

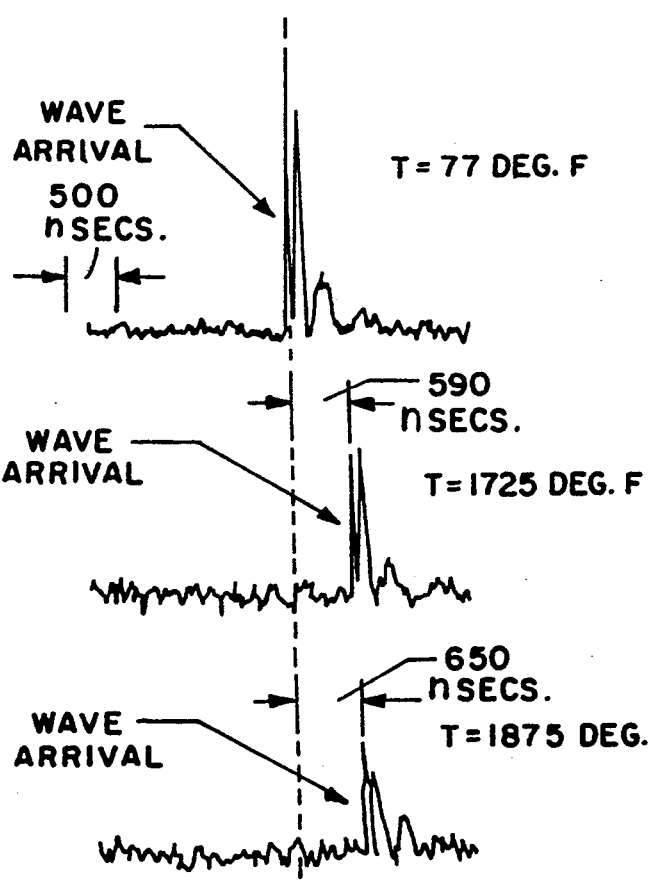
FIG.17a
FIG.17b
FIG.17c
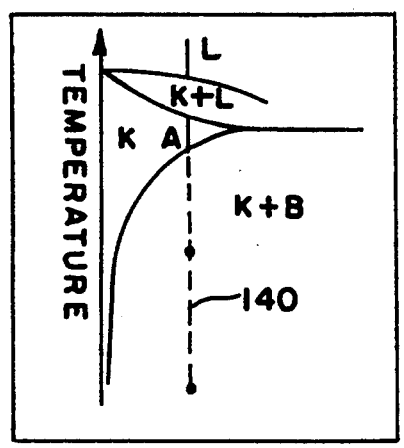
FIG.18
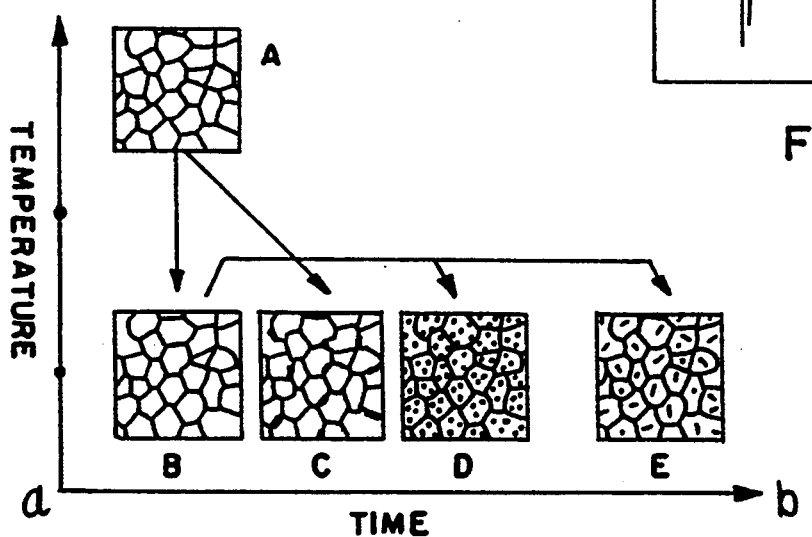
FIG.19

METHOD AND APPARATUS FOR MEASURING SURFACE MOVEMENT OF A SOLID OBJECT THAT IS SUBJECTED TO EXTERNAL VIBRATIONS

This invention was made with government support under contract no. DE-FC07-89ID12830 awarded by the Department of Energy. The government has certain rights in this invention.

This is a division of application Ser. No. 785,787 filed Oct. 31, 1991, now U.S. Pat. No. 5,286,313.

This invention in general relates to a system, apparatus and method for measuring wave motion in an object to control a process, and more specifically to control industrial processes where heat is inputted or taken away from the object.

The invention is particularly applicable to and will be described with specific reference to measurement of workpiece temperature and other physical and chemical characteristics of the workpiece to control industrial processes applying heat to or from a workpiece. However the invention has significantly broader applications and is not limited to heat processes. Further, the invention has additional unique features which make it suitable for applications other than process control such as its use as a polarizing interferometer, per se.

INCORPORATION BY REFERENCE

A report published by the National Technical Information Service, United States Department of Commerce, entitled "Development and Evaluation of Workpiece Temperature Analyzer for Industrial Furnaces", DOE/ID12830-1 (DE91004352) was authored by several of the inventors and released for public distribution on or about Dec. 31, 1990, although dated May, 1990. The NTIS report in its entirety is incorporated by reference herein and made a part and parcel hereof. In addition, applicants also incorporate by reference Gallagher et al U.S. Pat. No. 3,694,088 and page 61 of the April, 1991 issue of NASA Tech Briefs as indicative of background material disclosing polarizing, phase-shift interferometers so that details relating to phase-shifting interferometers need not be explained in detail herein.

BACKGROUND

A.) Industrial Heat Processes

Industrial heat processes are controlled by measuring the temperature of the object or the workpiece which is either heated or cooled. The traditional method of determining workpiece temperature in an industrial furnace is to measure the surface temperature of the workpiece with a radiation pyrometer, or a thermocouple positioned near the workpiece or a contact thermocouple. There are limitations with both devices. Contact thermocouples have limited use because they scratch the workpiece surface when used in a continuous process i.e. strip lines, or they require drilling of a hole in the workpiece if used in a batch furnace or, in other applications they cannot be used. Radiation pyrometers are traditionally used for non-contact surface temperature measurements but suffer from inherent inaccuracies because of interferences by radiation from furnace hot walls and gases in the furnace. Further, the accuracy of radiation pyrometers is adversely affected by varying emissivity of the workpiece during thermal processing. The emissivity encountered in certain strip applications i.e. galvanizing, aluminizing, galvannealing, etc. preclude pyrometer direct applications in the sense that present schemes utilize a pyrometer and one of two emissivities. If If one is wrong, the other is assumed correct. In those instances when contact thermocouples or pyrometers cannot be employed, secondary measurements are obtained and correlated to the expected temperature of the workpiece to control the process. For example, the temperature of the furnace gas is sampled and by means of empirical equations the process is controlled. In plasma are applications or induction heating applications the electrical power inputted to the workpiece is controlled. In addition other measurements are taken and the process is controlled by the combination of measurements. For example, the furnace gas is sampled and its makeup analyzed to determine the extent that the heat treating process has progressed. Again, all of these controls are secondary in that something other than the workpiece is measured and from that measurement an expected characteristic of the workpiece is extracted.

With respect to measurement of temperature, traditional, nondestructive temperature measuring instruments lack any capability to measure temperature gradients within the workpiece. There are thermal processes where temperature uniformity (plus or minus 5° F.) from surface to the core of the workpiece is critical to achieve uniform phase transformation reactions in the bulk of the workpiece. Traditional processing techniques provide a predetermined hold or soak time at which uniformity is to be achieved and this results in increased process cycle time etc.

With respect to measuring physical or chemical properties of the workpiece, there are no instruments which can nondestructively, directly measure the properties of the workpiece during the heat treat process, although theoretically there are, of course, ways to actually measure temperature gradients. As indicated above, secondary measurements are obtained and correlated to what the expected properties of the material would be. For example, in the heat treat carburizing process, the furnace or process gas is sampled to determine its carbon content and based on the measured variation in carbon content of the furnace gas the process is controlled on the underlying assumption that the carbon disassociated from the furnace atmosphere is uniformly infused into the workpiece case.

B.) Ultrasound Waves

As noted in the NTIS report a significant body of information has been published on the generation of elastic waves in solids. It is known that when transient changes in the structure of a solid occur, elastic waves are generated on the surface and in the bulk of the workpiece. It is known that there are four types of waves which can propagate in solids, namely longitudinal and/or shear, Rayleigh or surface and Lamb waves. The longitudinal and/or shear waves travel through the bulk of the solid with the longitudinal waves being almost twice as fast as the shear waves. The Rayleigh waves travel only on the surface of the solid with speeds slightly less than the shear waves. The Lamb waves propagate only through very thin plates and have been used to measure the thickness of these plates. Longitudinal bulk waves and shear bulk waves have also been extensively used for detection of flaws, measurement of elastic properties of solids and monitoring of steel solidification.

It is known to use lasers to generate ultrasound waves on the surface of the workpiece. See for example Kaule U.S. Pat. No. 4,144,767. Further, it is known in the literature search of the NTIS report that three types of waves (longitudinal, shear, and Rayleigh) can be produced by laser in an unheated environment in aluminum, brass and various types of steel without any surface damage.

All of the references uncovered in the NTIS literature search used transducers i.e. conventional piezoelectric transducers to detect the sound wave. Clearly, placing the transducers in a heated environment either destroys the transducer or, at the very least requires extensive correcting circuitry to compensate for the temperature effect on the piezoelectric device which in turn can adversely affect the readings from the device.

C.) Optical Interferometers

As discussed in the literature search of the NTIS report, the industrial use of an optical interferometer to detect the movement of ultrasound waves at elevated temperature has not been uncovered. This is not surprising when it is considered that normal applications for interferometers require precise optical path lengths be established for the reference and signal light beams which cannot exist in an industrial setting. Accordingly, considering only variations in path beam length arising in industrial applications, one would not expect an interferometer to have the sensitivity to consistently measure ultrasound wave movement in an industrial setting with typical interferometer such as Twyman-Green, Michelson, Mach-Zehnder, Fabry-Perot. At the same time within the optical interferometer art, phase-shifting interferometers are well known and it is a characteristic of phase-shifting interferometers that the optical beam paths need only be set equal to one another within the coherence length of the beam light. However, phase-shifting interferometers require several phase-shifts in the reference beam to obtain the measurement i.e. see for example Gallagher U.S. Pat. No. 3,694,088, and the time required to generate multiple phase-shift readings, until the present invention, would prevent the use of phase-shifting interferometers to measure the surface movement of an object in response to an ultrasonic wave induced therein.

SUMMARY OF THE INVENTION

Accordingly, it is one of the principle objects of the invention to directly and nondestructively measure a property of a solid object to achieve improved control of industrial processes, typically processes which are used in the manufacture of the object.

In accordance with a principle feature of the present invention a control system, apparatus and/or method is provided for regulating industrial processes by nondestructively sensing surface wave movement on a workpiece and the system includes a mechanism for generating a sound wave in the workpiece, a polarizing interferometer for recording surface movement of the workpiece in response to movement of the sound wave and a mechanism for calibrating surface movement measured by the polarizing interferometer relative to workpiece property whereby the process is controlled by the measured property actually existing within the workpiece.

In accordance with a more specific feature of the invention the interferometer (apparatus and method) includes mechanism for generating a source of light, and an initial beam splitter for splitting the light source beam into a reference beam and a signal beam which in turn is directed against the workpiece in the vicinity of the sound wave. A mirror arrangement is provided for collecting scattered light from the workpiece as the signal beam and directing the signal beam onto a signal beam path while the reference beam is also directed onto a reference beam path. A mechanism is provided for polarizing the reference beam and the signal beam with at least one of the beams generally circularly or elliptically polarized and an arrangement is provided to combine the signal and reference beam into a resultant polarized beam with one of the signal and reference beams which make up the resultant beam having a predetermined phase-shift relative to the other. A photon detecting device senses light in the resultant beam and generates an electrical signal in response to the sensed light indicative of the intensity of and the relative phase-shift of light attributed to the signal beam and a calibrating arrangement is provided for correlating the electrical signal with characteristics of the sound wave and in turn correlating the sound wave characteristics with a property of the workpiece so that the sensed wave movement defines a specific property of the workpiece.

In accordance with another feature of the invention, a timing arrangement is employed to generate a plurality of sound waves each of which is correlated in timed relationship to the electrical signals generated by the photon detecting device to generate a plurality of electrical signals which in turn are conditioned to generate an average signal truly indicative of sound wave speed,. In other words, the timing arrangement establishes the precise time at which the interferometer records a phase shift indicative of the arrival of the sound wave at a point on the workpiece surface from which the time-of-flight of the sound wave is computed and compared to a reference signal or "look up" tables to ascertain the workpiece property such as temperature. In accordance with one important aspect of the invention, the signal conditioning arrangement comprises mechanisms for squaring each signal, summing the total of the squared signals and averaging the sum to arrive at an accurate average signal which dissipates adverse signal noise effects. Alternatively, the conditioning mechanism can simply comprise a scanning arrangement which discards unresponsive signals and generates an average signal from a discrete subset of responsive signal.

In accordance with another significant feature of the invention, Rayleigh surface waves and longitudinal and/or shear waves are individually sensed by the interferometer to provide two distinct electrical signals. A mechanism is provided for calibrating each of the signals to ascertain a sensed property of the workpiece. In accordance with one aspect of the invention the sensed property determined by the calibrating mechanism is the temperature of the workpiece so that sensing both waves provides a measurement of the temperature distribution within the workpiece. In accordance with another aspect of the invention the sensed property is determined by comparing the sensed wave speed to a reference wave speed to determine desired physical and/or metallurgical properties imparted to the workpiece during the industrial process which a metal object would undergo, such as phase transformations. In this connection the system could sense not only time-of-flight but also generate a signal indicative or correlatable to the amplitude of surface movement.

In accordance with one particularly important aspect of the invention, the type of industrial process controlled by the invention herein, is of the heat treating type in which the workpiece is heated in an insulated furnace enclosure which inherently transmits to the workpiece a random vibration having a speed and/or frequency less than that of the ultrasound waves induced in the workpiece. The furnace enclosure contains sight windows to permit mounting not only the interferometer outside the heated enclosure but also mounting of the exciter laser generating the sound waves in the workpiece outside of the enclosure, thus obviating the adverse influences of heat on the mechanism generating the sound wave and sensing the movement of the workpiece surface in response to the sound waves. Significantly, the random vibrations permit discernible generation of electrical signals indicative of phase shifts in the signal light beam so that only one photon detector is required when a plurality of measurements are recorded in a short time span to ascertain time-of-flight.

In accordance with an important feature of the invention, a focusing mechanism is provided in the signal beam path focusing the signal light beam on a limited spot on the workpiece to produce a large speckle pattern indicative of the surface roughness of the object, and an adjustable aperture mechanism is situated in the path of the resultant beam to focus on the photon collecting device a portion of the resultant beam which essentially encompasses only one speckle in the granular speckle pattern so that a diffusive surface of the workpiece does not interfere with the measurement of the workpieces surface movement.

In accordance with yet another aspect of the invention, the mirror arrangement establishing the optical reference beam path and the signal beam path is adjustable to the extent that the paths are optically equal in length to a value within the coherence length of the light source beam, thus permitting application to industrial processes in which the environment prevents precise adjustment of nonstable (i.e. vibrating) optical path lengths.

In accordance with another specific feature of the invention, an adjustable mechanism is provided to variably retard the plane of polarization of the linearly polarized light source beam prior to combining the signal and reference beams into the resultant beam to achieve optimum light distribution between the signal and reference beam whereby the surface motion of opaque workpieces can be measured. Still further, the state of polarization of the signal beam is changed to elliptically polarized light and the retardation plane mechanism varied to produce in the resultant beam, a signal beam component which is circularly polarized. A beam splitter mechanism may be provided in the resultant beam path to produce two orthogonal resultant beam projections each of which generates an electrical signal in photon collecting devices and a calibrating arrangement is effective to generate one signal indicative of the absolute difference in optical path lengths between signal and reference beams.

In accordance with still another specific aspect of the invention, an optical interferometer (apparatus and method) is provided which includes a source of light which is linearly polarized, a mechanism for splitting the source of light into a signal light beam and a reference light beam, a mirror mechanism for forming a signal beam path along which the signal beam travels to and from an object whose surface is to be measured and a mirror mechanism for forming a reference beam path along which the reference beam travels with the reference beam path and the signal beam path being approximately optically equal in length and within the coherence length of the light source beam. A mechanism is provided to change the polarized state of one of the reference and light beams and a mechanism is provided to combine the reference beam and the signal beam into a resultant beam. A mechanism is also provided to split the resultant beam into two orthogonal, polarized light projections and a photon detecting mechanism senses the intensity of each orthogonal project and generates an electrical signal correlated thereto. A mechanism is then provided for conditioning the signals so that the difference in optical path lengths between signal and reference beams can be measured instantaneously and without introducing multiple phase shifts into the reference light beam.

In accordance with still another specific aspect of the invention, an optical interferometer is provided which includes a source of light, a mechanism for splitting the source of light into a signal light beam and a reference light beam, a mechanism for forming a signal beam path along which the signal beam travels to and from an object whose surface is to be measured and a mechanism to form a reference beam path along which the reference beam travels, with the reference beam path and the signal beam path approximately optically equal in length and within the coherence length of the light source beam. A mechanism is provided for linearly polarizing, in a vertical plane, one of the signal and reference beams and linearly polarizing the other one of the signal and reference beams in a horizontal plane. A combining mechanism is then provided to combine the reference beams and the signal beams into a resultant beam and split the resultant beam into two equal light projections. A first splitting arrangement is provided to split one of the two light projections into two, orthogonal, linearly polarized light projections and a second splitting arrangement is provided to circularly polarize the other one of the light projections and split the circularly polarized light projection into two orthogonal linearly polarized light projections so that each of the four light projections are shifted in phase 90° relative to one another. Photon detectors are then provided for generating electrical signals for each orthogonal, linearly polarized light projection which are correlated to the intensity and phase-shift of the signal beam and an arrangement for conditioning the signals results in a measurement of the difference in optical path lengths between the signal and reference beams from only one instantaneous reading thereby obviating the necessity of making several phase-shifts in the reference beam and several measurements thereof to determine the difference in path lengths.

It is a principle object of the invention to provide a system, method and/or apparatus which can non-destructively measure sound waves induced in a piece, such as a workpiece in an industrial heat treat or furnace environment and to then, in accordance with the measurements obtained on the work, gather information about the piece to control the industrial process.

In accordance with the principle object, the system, and/or apparatus of the present invention possesses any one or more of the following specific objects when compared to other known systems:

a) Remote detection and large standoff permitting remote installation, such as outside a furnace.

b) Simple and reliable optical system suitable for an industrial environment.

c) Beneficial rather than detrimental effect of external vibrations for measurement of sound wave characteristics.

d) Excellent signal-to-noise ratio even for thick steel workpieces of 3".

e) Ability to detect measurable time-of-flight and/or structural differences of sound waves during heating of the work.

f) Ability to detect measurable time-of-flight and/or structural differences in sound waves through workpieces in various physical or metallurgical states.

g) Moderate cost of components.

It is a more specific object of the invention to provide a polarizing interferometer which can be simply and cost efficiently constructed.

It is yet another object of the invention to provide a control system for an industrial heat process which uses laser induced sound waves in the work and a polarizing interferometer to sense movement of the sound waves in the work so that the work can be non-destructively measured during the process and the process regulated in accordance with the measurements indicative of a property actually existing as of the time of measurement in the work.

Yet another specific object of the invention is to provide an instrument for non-destructively measuring the bulk temperature, surface temperature and/or temperature distribution within a workpiece during a heat treat process.

Yet another specific object of the invention is to provide a polarizing interferometer which can measure movement of the surface of a workpiece notwithstanding vibration of said workpiece.

A still more specific object of the invention is the provision of a polarizing interferometer which utilizes random vibrations of a workpiece to measure speed of sound waves in a workpiece so that only one photon sensing device is required to generate a responsive signal thus producing a cost effective device.

A still further specific object of the invention is to use a strobe light to generate the interferometer light source beam in the system described herein thus resulting in a cost effective interferometer.

Still another specific object of the invention is to provide a polarizing interferometer which can sense movement of diffusive workpiece surface notwithstanding the fact that such surface is so diffusive that it exhibits speckle light patterns.

Still another object of the invention is to provide an interferometer which can measure generally opaque objects by means of an adjustable half wave plate that varies the light distribution between reference and signal beams and to optimize the intensity of the electrical signal.

Still another specific object of the invention is to provide a control system which uses either a sampling and/or a signal processing technique in combination with an interferometer to accurately detect movement of an ultrasound wave in a workpiece.

Still another specific object of the invention is to provide an instrument which uses a laser to impart a sound wave to a workpiece and a polarizing interferometer to measure the shear, and/or surface and/or longitudinal and/or shear ultrasonic waves resulting therefrom.

A still further object of the invention is to provide a system for measuring the temperature and/or properties of metal work in industrial heat processes where such properties were not heretofore capable of being directly measured in the work and controlling the process by such measurements including, but not limited to, any one or more of the following:

i) ion processes employing glow discharge techniques where the ion glow prevented workpiece temperature measurement;

ii) continuous strip processing such as galvanneal, galvanizing, aluminizing, etc., where strip emissivity prevented temperature measurement;

iii) aluminum age hardening or annealing where metallurgical characteristics were not previously measured;

iv) case depth heat treat hardening processes such as carburizing where the case depth could not previously be directly measured during the process;

v) heat treat processes which employ quenching and interrupted quenches;

vi) continuous casting and/or brazing processes in which the center of the casting or the brazing is molten when the work leaves the heat zone;

vii) sintering processes in which powder metal parts are densified and similarly ceramic process;

viii) surface treating processes involving various metallurgical processes such as decarburizing, oxidizing, blueing etc.;

ix) processes involving composite materials or bi-metallic metals; and x) in general processes which vary or control grain size or structure.

Still yet another object of the invention is to provide a phase shifting interferometer which is capable of measuring an object without having to introduce multiple phase shifts to the signal or reference beam.

Still yet another object of the invention is to provide a mirror arrangement in an industrial process permitting multiple location measurements of sound waves traveling in a workpiece.

An important object of the invention is to utilize the sound wave techniques of the present invention not only to control the workpiece process but also to monitor the integrity and soundness of furnace components subjected to the heat environment, such as electric heating elements, hearth components etc., to insure that the furnace is functioning properly.

In conjunction with the two immediately preceeding features, it is still yet another important object of the invention to utilize a mirror arrangement, preferably a rotating and stationary mirror arrangement to use one workpiece analyzer to test furnace component soundness as well as monitor workpiece performance or to monitor a plurality of zones within a batch, continuous, or semi-continuous furnace or strip line i.e. time sharing type of arrangement.

Still yet falling within the broad object of the invention is the use of an optical interferometer to measure not only the time of flight of a sound wave in a workpiece to obtain information about the workpiece, but also to measure the amplitude or amount of surface movement in the workpiece attributed to the sound wave and to correlate not only the time of flight of the sound wave but also the workpiece movement attributed to the sound wave to determine physical and/or metallurgical characteristics of the workpiece.

Falling yet within a broad object of the invention is the utilization of an interferometer to measure any wave motion in a solid object which preferably is in a thermal elastic state, but which in theory could be in its liquid state to determine a property of the object.

A still further object of the invention is to use the system disclosed herein to accept or reject manufactured parts or accept and reject manufactured parts which are subjected to stress testing such as vibrations by non-destructively measuring such parts. Still yet another object is to provide a system which is capable of determining the composition, physical and/or metallurgical, of manufactured parts.

Still further advantages of the invention will become apparent to those skilled in the art upon reading and understanding of the following description of the preferred embodiment.

BRIEF DESCRIPTION OF THE DRAWINGS

The invention make take form in certain parts in arrangement of parts, a preferred embodiment of which will be described in detail herein and illustrated in the accompanied drawings which form a part hereof and wherein:

FIG. 1 is a pictorial representation of a batch furnace fitted with the control system of the present invention;

FIGS. 2A, 2B, and 2C are schematic illustrations of the positions of the impulse and detecting lasers used in the invention;

FIGS. 16A, 16B, 16C and 16D are schematic illustrations of the signal conditioning method employed in the invention. FIG. 16E is a schematic block diagram of the signal conditioning scheme shown in FIGS. 16A, B and C;

FIGS. 17A, 17B and 17C are timed, electrical signal traces illustrating time of flight of sound waves in a solid object at various temperatures;

FIG. 18 is an equilibrium diagram for an aluminum copper;

FIG. 19 are pictorial representations of grain patterns for various metallurgical reactions incurred in heat treating aluminum copper alloy;

DETAILED DESCRIPTION OF THE INVENTION

Figure 3:
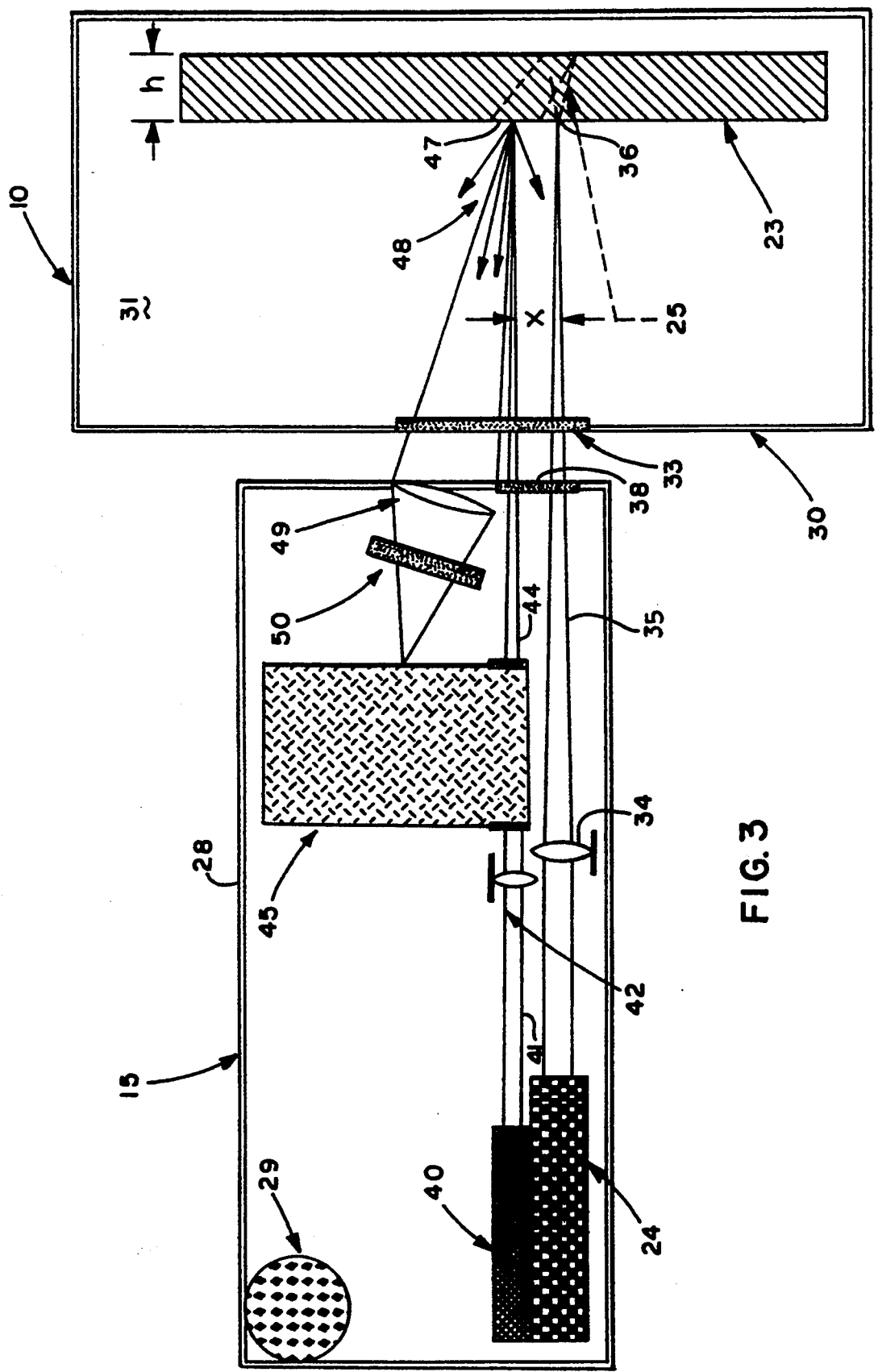
FIG. 3 is a schematic illustration of some of the components of the invention.

Referring now to the drawings wherein the showings are for the purpose of illustrating preferred and alternative embodiments of the invention only and not for the purposes of limiting the same, there is shown in FIG. 1, a control system for a batch-type industrial heat treat furnace 10. The control arrangement includes (i) furnace temperature thermocouple 12 for sensing the temperature of the furnace atmosphere, (ii) a gas arrangement, not shown but indicated schematically as arrow numbered 13 which controls the burner firing (i.e. the temperature inputted into furnace 10) and optionally, the furnace gas composition, (as is well known in the art and which will not be described or shown in further detail herein), (iii) the workpiece analyzer 15 of the present invention, which will be described further herein, and (iv) a central processing unit 16. The computer or a central processing unit 16 typically includes a high limit temperature instrument 17 and a floppy disk drive 18 for any particular program control. As generally indicated schematically in FIG. 1, workpiece analyzer 15 inputs a process control characteristic, typically temperature as indicated by arrow numbered 20 and thermocouple 12 inputs the temperature of the furnace atmosphere as indicated by arrow numbered 21 into the central processing unit 16 which will use the information with appropriately developed, conventional programs to control the furnace gas atmosphere composition and furnace temperature by signals outputted to gas control 13. Prior to the invention, central processing unit 16 would extrapolate or empirically develop workpiece temperature 20 to regulate gas control 13. In accordance with the invention the workpiece temperature or other sensed workpiece characteristic is directly inputted to central processing unit 16 for better control of the industrial process performed by batch-type industrial furnace 10. The programs do not per se form part of this invention in its broad scope. It is believed sufficient to simply note that one skilled in the art would have no difficulty in modifying existing computer programs to directly input into the program the workpiece temperature or other characteristic sensed by workpiece analyzer 15 and control the process accordingly. Thus, disclosure of a process control program is not believed necessary to an understanding of the invention and is not disclosed herein.

FIGS. 2A, 2B and 2C illustrate how the two principle components of the invention may be positioned relative to workpiece 23 to measure movement of a wave therein. The two components include a device which in the preferred embodiment is an impulse laser 24 for generating a wave indicated by reference numeral arrow 25 which is sensed by a detecting device which in the case of the invention is an interferometer 26 and specifically a polarizing interferometer.

One of the basic concepts of the invention is to use a polarizing interferometer 26 to monitor the arrival of the sound waves at an appropriately selected spot on workpiece 23. The principle of the polarizing interferometer operation is that any deflection of the surface of workpiece 23 can lead to phase shifts of the interferometer beams and the phase shifts can be detected as a change in the polarization level of the interfering beams. Thus time at which impulse laser 24 is fired can be recorded and the time at which interferometer 26 senses workpiece surface movement can be recorded to establish time-of-flight of the ultrasound wave from which its speed can be calculated. In accordance with the preferred embodiment, the speed of ultrasound waves is a function of temperatures of the workpiece and thus the temperature can be determined by using self-contained calibration curves or look-up tables. Time-of-flight as discussed hereafter can also be used to determine other characteristics, physical and/or metallurgical, of the workpiece. However, the invention is not limited in scope to only time-of-flight, but also can include measurement, relative or otherwise, of surface displacement of workpiece 23 attributed to sound waves and correlating same to characteristics of workpiece 23, physical and/or metallurgical.

In accordance with the broad concepts of the invention, the wave producing device need not be an impulse producing laser 24, but could be a conventional piezoelectric transducer or any other known device to generate a wave in workpiece 23 although, in accordance with specific features of the invention, an impulse producing laser such as a Questech Excimer gas laser is preferred because it permits the instrument to be located outside the furnace and can generate the desired waves without marking or otherwise marring the surface of workpiece 26. Further, in accordance with the preferred embodiment of the invention, impulse laser 24 produces sound waves, specifically ultrasound waves, in workpiece 23. While in the preferred embodiment, ultrasound waves are utilized so as not to be confused with external vibration and specifically ultrasound waves having frequencies higher than about 100 kHz, the invention is not limited to ultrasound waves. The invention in its broader applications could in theory include waves other than sound waves and workpiece 23 can in fact be in a liquid state. The detection device in accordance with the invention is the interferometer 26 disclosed herein. FIG. 2A shows the relative position of impulse laser 24 and interferometer 26 for measuring wave movement in thin workpieces such as strip or thin plates whereat wave 25 generated in workpiece 23 is a surface wave such as lamb waves. FIG. 2B illustrates the position of impulse laser 24 and interferometer 26 for measuring reflected wave movement in workpieces 23 which may be from ⅛" to several inches thick. Wave 25 generated in workpiece 23 of FIG. 2B will include longitudinal and/or shear as well as surface waves. FIG. 2C illustrates the relative position of impulse laser 24 and interferometer 26 for thick workpieces 23 in which interferometer 26 measures bulk or longitudinal and/or shear wave movement through workpiece 23. In the arrangement shown in FIG. 1, workpiece analyzer 15, for purposes of illustration, is a FIG. 2B application. If the workpiece 23 being heated within furnace 10 was a thick item, impulse laser 24 would be mounted on the opposite side of furnace 10 from that of workpiece analyzer 15. As will be explained in further detail below, impulse laser 24 will operate to produce a series of wave pulses over a fixed time period. To avoid marking or marring the surface of workpiece 23 during this time period, the point of impact of the laser beam will be slightly varied. Accordingly interferometer 26 may also be slightly moved to coincide with movement of impulse laser 24 by means of a common mount such as shown in FIG. 3.

In verification tests, a Model 2220 Questech laser was used to generate ultrasound waves from which the electrical signal traces disclosed herein were produced. Laser data is set forth below:

| | |
|---|---|
| Gas: | XeCl |
| Wavelength: | 308 nm |
| Rated Pulse Energy: | 200 mJ |
| Actual Pulse Energy Used in Experiments: | 80 mJ |
| Max Repetition Frequency: | 50 Hz |
| Average Power: | 8 W |
| Pulse-to-Pulse Stability: | ±3% |
| Pulse Duration (nominal FWHM): | 10–25 ns |
| Beam Dimensions (V × H): | 8–13 × 20 mm |
| Beam Divergence (V × H): | 2 × 3 mr |
| Timing Jitter from External Trigger: | ±2 ns |

Impulse laser 24 is used not only as an ultrasound generator but as a triggering source as well. As will be described with reference to FIG. 16E, each time the laser fires a pulse onto the sample surface, a very small part of the beam is diverted into a fast response photomultiplier which is then used to trigger the data acquisition system (i.e. establish a starting point). A Tektronic 2430 oscilloscope (not shown) can be used as a data acquisition unit (10 nsecs resolution) which is interfaced with central processing unit 16 where on-line processing of the data is preformed. It is contemplated that any energy source, light for example, such as that produced by a flash lamp (and more specifically, a strobe light) can be used to replace the impulse laser for cost consideration purposes.

Referring now to FIG. 3, a reflective wave (FIG. 2B) measurement apparatus is disclosed. In FIG. 3, workpiece analyzer 15 is entirely mounted within a workpiece analyzer housing 28 which contains a cooling fan 29 so that the electrical devices contained therein are not subjected to excessive ambient temperatures. Workpiece analyzer 15 is mounted about 1 meter away from the work contained in industrial furnace 10 which has conventional insulated furnace walls 30 which in turn define an insulated furnace enclosure 31. Furnace enclosure 31 contains workpiece 23 which is heated and in the process thereof heat treat processes are effected thereon. Within at least one furnace wall 30 is an infrared sight window 33 which permits viewing of workpiece 23 within furnace enclosure 31.

Within workpiece analyzer housing 28 is impulse laser 24 described above. An adjustable translation mount and lens 34 focuses impulse laser light beam 35 to impinge a point 36 on workpiece 23, it being understood that impulse light beam 35 passes through sight window 33 and a window 38 in workpiece analyzer housing 28. Focusing impulse laser light beam 35 at point 36 produces sound waves 25 traveling through workpiece 23. Also mounted within workpiece analyzer housing 28 is a detecting laser 40 which generates a monochromatic source light beam 41 which by means of an adjustable translation mount and lens 42 passes through windows 44 of an interferometer 45 and then through window 38 in workpiece analyzer housing 28 and sight window 33 and furnace wall 30 before impinging workpiece 23 at a point 47. Satisfactory results have been obtained with an He-Ne detecting laser. However, it is contemplated that any coherent light to generate light source beam 41 which may be monochromatic can be used. As shown in FIG. 3, the distance "X" between the impingement point of impulse laser beam 36 and source light beam 47 is established as a function of the thickness "H" of workpiece 23, the intensity of the impulse beam etc. in accordance with conventional and known theory. As diagrammatically shown in FIG. 3, source light beam 41 will after impinging point 47 on workpiece 23 scatter as indicated at 48, pass through furnace sight window 33 and be collected by a collection lens 49 and pass through a filter 50 before being directed into interferometer 45.

Figure 4:
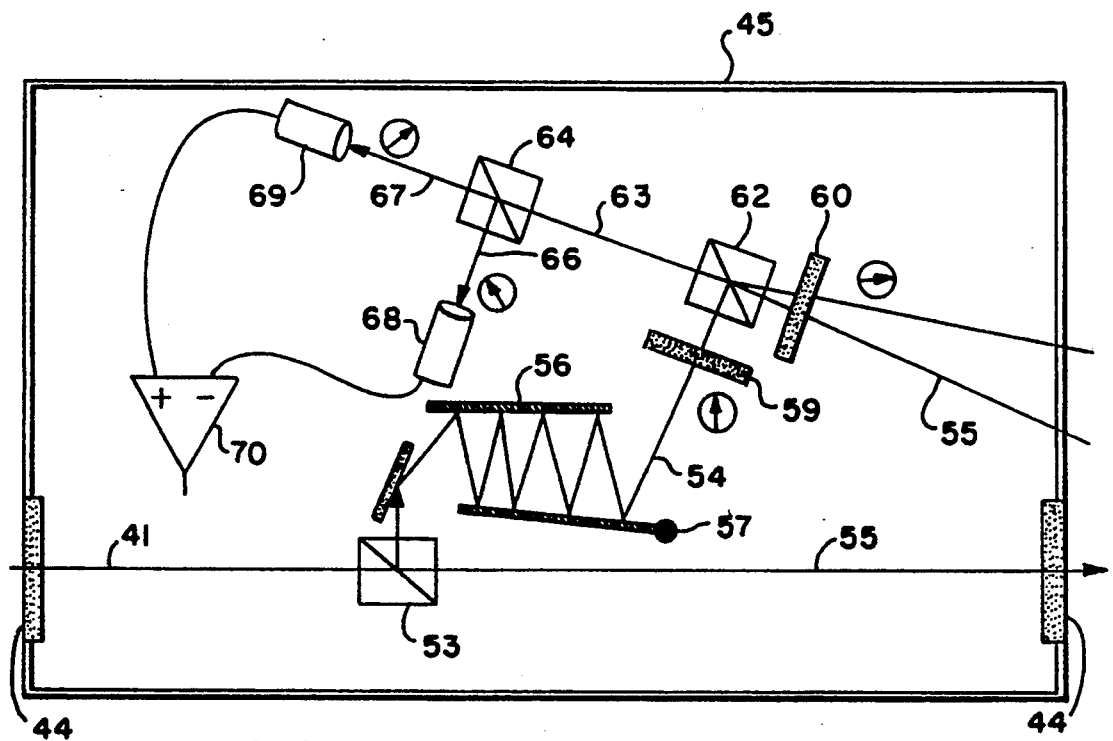
FIG. 4 is a schematic illustration of certain components of an alternative embodiment of the invention not shown in FIG. 3.

Referring now to FIG. 4 there is shown in schematic form an arrangement of components within interferometer 45. All of the components are individually well known and commercially available. As shown the laser source beam 41 is split by a beam splitter 53 into a reference beam 54 and a signal beam 55. A mirrot 56 which is adjustable as at 57 is provided in the path of reference beam 54 so that the optical path length of reference beam 54 is approximately equal to the optical path length of signal beam 55, and in fact reference beam path 54 and signal beam path 55 are equal in length to within a value which does not exceed the coherence length of light source beam 41. In the path of reference beam 54 is a linear polarizer 59 and in the path of signal beam 55 is also a linear polarizer 60. For consistency in terminology herein, the term "state of polarization" or "polarizing state" refers to any polarization of light, whether circular, elliptical, linear, or even if the plane of polarization is retarded. In the embodiment disclosed in FIGS. 4 and 5 one of the linear polarizer 59, 60 polarizes its light beam on the vertical axis while the other linear polarizer polarizes its light beam on the horizontal axis. Linearly polarized reference beam 54 and linearly polarized signal beam 55 are then combined in a beam combiner 62 to produce a resultant beam 63 which is then passed through a polarizing beam splitter 64 which splits the resultant beam into two orthogonal linearly polarized light beam projections 66, 67. The intensity of orthogonal light beam projection 66 is recorded by photon tube 68 and the intensity of second orthogonal light beam projection 67 is recorded by photon tube 69. Electrical signals produced by photon tubes 68, 69 are summed in a summing amplifier 70 to develop a difference signal indicative of the phase-shift in signal beam 65 which is then inputted to central processing unit 16.

In the interferometer disclosed in FIG. 4, the interfering beams i.e. signal and reference beams 55, 54 are cross-polarized i.e. 59, 60 and then combined at combiner 62 and their relative phase is determined by measuring the polarization of the resultant beam 63. Conceptually, this is a demonstrated and convenient way to make such measurements. The point is that if the surface of the workpiece moves, signal beam 55 will change in phase relative to reference beam 54 and this will change the polarization of their super-position in resultant beam 63. Referring to the polarization conventions shown in FIG. 4, if the two beams i.e. reference beam 54, signal beam 55 are in phase, the super position of both beams will be polarized as indicated by the intensity signal generated at first photon multiplier 69. If the two beams are 180° out of phase, the resulting polarization will be the intensity signal generated at second photon tube 68. Looking at the difference between the two signals i.e. Electrical photon tube signal 68, 69 the effect of motion on the surface of workpiece 23 can be ascertained. The absolute phase difference is meaningless and is not measured in FIG. 4. What matters is the rapid change in phase due to the sound wave in workpiece 23. This approach eliminates the need to mount all the optics so that they stay fixed to within a wave length i.e. using heavy tables or steel beams which are often associated with interferometric measurements. All that is required is to keep the reference and signal beam path lengths approximately equal and to keep the optics well enough in line to properly combine the beams i.e. to being within the coherence length of the light source beam. So long as the external vibrations are at a lower frequency then one wishes to observe, there is no effect on phase change.

It is to be noted that the intensity difference between the two measured electrical intensity signals in FIG. 4 i.e. the difference in intensities between photon tube 68, 69 varies as the cosine of the relative phase of the two beams. This means that the system has a maxima and minima and, at those phases, the system is insensitive to changes in phase. If, on a particular pulse, the intensity happens to be divided about equally between the two photon tubes 68, 69 because, the signal and reference beams 55, 54 were 45° or 135° etc. out of phase, one would observe a strong signal from a small change. But if the phase happened to be such as to put all the light to one of the two photon tubes 68, 69, a small change in phase would have only a second order effect with no discernible signal. It is theoretically possible to address this problem in principle by controlling the relative path differences perhaps via a feedback system on the reference beam mirror. A more feasible solution to the problem is disclosed in FIG. 5 in which, not only is the sensitivity issue addressed, but the absolute phase difference between reference and signal beams can be recorded thus expanding the use of the interferometer disclosed herein.

Figure 5:
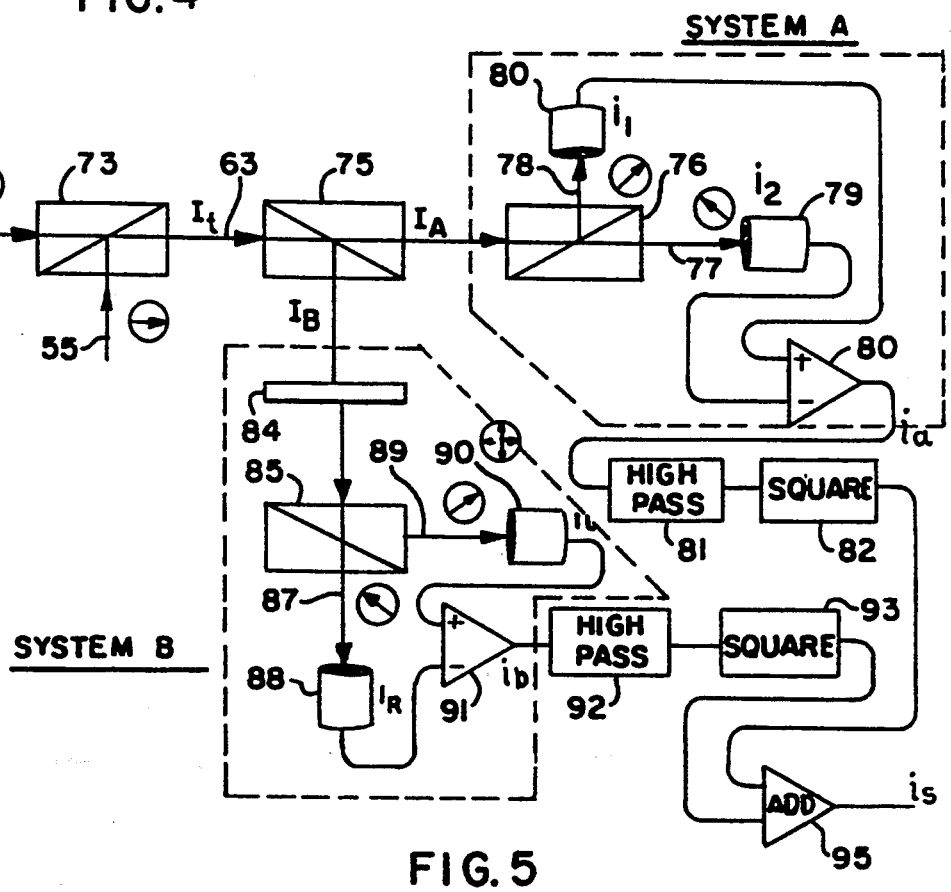
FIG. 5 is a schematic illustration of the components of an alternative embodiment of the interferometer of the present invention.

Referring now to FIG. 5 the reference beam 54 and signal beam 55 are cross-polarized i.e. horizontally and vertically and combined in a polarizing beam combiner 73. The polarized resultant beam 63 is then split into two with a 50% reflecting (non-polarizing) mirror 75 to produce two equal beam components designated $I_A$ and $I_B$ in FIG. 5. The $I_A$ component is split by a 45° polarizing beam splitter into two orthogonal intermediate light projections 77, 78 and photon multiplier 79 receives first intermediate beam projection 77 and second photon multiplier 80 receives second intermediate beam projection 78 to develop electrical signals designated $i_1$ and $i_2$. These signals $i_1$, $i_2$ may then be summed in a summing amplifier 80 to arrive at a difference signal which is passed through a high pass filter 81 and squared as at 82. The second resultant beam component designated as $I_B$ in FIG. 5 is circularly polarized by being passed through a birefringent quarter wave plate 84. The circularly polarized light beam is then passed through a polarizing beam splitter 85 which separates the beam into a right hand circular component 87 the intensity of which is recorded by right hand photon multiplier 88 and a left hand circular component 89 the intensity of which is recorded by left hand photon multiplier 90 to produce in system "B" two photon multiplier signals relative to one another and also shifted in phase 90° relative to system "A". The photon multiplier signals in system "B" and in system "A", are then summed in a summing amplifier 91 to produce a difference signal which is then passed through high pass filter 92 and then squared as at 93. The signals for systems "A" and "B" are then added at summing amplifier 95 to give an electrical signal $i_s$ indicative of the absolute phase-shift. In prior art, polarizing interferometers a quarter wave plate in the reference beam is rotated by means of an encoder through various phase angles to generate predetermined phase-shifts which in turn generate multiple readings which are then algebraically resolved to determine an absolute phase-shift from which the distance between the signal and reference beams can be calculated. As indicated above, the time constraints required to shift a quarter wave plate would preclude use of phase shifting interferometers for sensing sound wave displacement. In accordance with the system shown in FIG. 5 absolute measurement surface displacement is possible from one instantaneous reading. While it is the primary objective of this invention to measure time of flight of sound waves within workpiece 23, nevertheless it is contemplated as falling within the scope of the present invention that in ascertaining certain physical or metallurgical properties of workpiece 23, the amplitude or surface displacement of workpiece 23 attributed to sound wave 25 may, in certain instances, be measured and correlated to a known wave amplitude to determine when the desired workpiece property or characteristic has been achieved. The system illustrated in FIG. 5, as are the other systems subsequently discussed herein, is capable of recording such measurements. In other words, the systems are capable of operating as polarizing interferometer per se but with the added advantage of obtaining a measurement from one reading.

The mathematics demonstrating the soundness of the system disclosed in FIG. 5 is set forth at pages 34–42 of the NTIS report incorporated herein by reference. Comparing the system disclosed in FIG. 5 to that disclosed in FIG. 4 it is again noted that the signal and reference beams are cross-polarized and then combined as before, but the combined beam is then split into two with a 50% reflecting (non-polarizing) mirror. One of these is then separated into the two intermediate linear polarization components as done in FIG. 4, while the other is passed through a birefringent quarter wave plate and then split into two intermediate linear components—a sequence that separates the two circular components of the original beam. Both pairs of intensities are different, the two difference signals are passed through high pass filters and then squared and finally the two are added. To obtain a result comparable to the output of the FIG. 4 system, the square root of the final signal can be taken. A bit of algebra may clarify the effect of all of this. If the relative phase of the signal and reference beams is denoted "p", then the two intensity difference signals are proportional to cosine (p) and sine (p). Going through a high pass filter is like taking the derivative, so the signals after the filters are $-(dp/dt)\sin(p)$ and $(dp/dt)\cos(p)$. When these are squared and added, the result is just proportional to the square of $dp/dt$ which is the change in phase between the signal and reference beams—that is the motion of the surface of the piece due to the sound wave.

Figure 6:
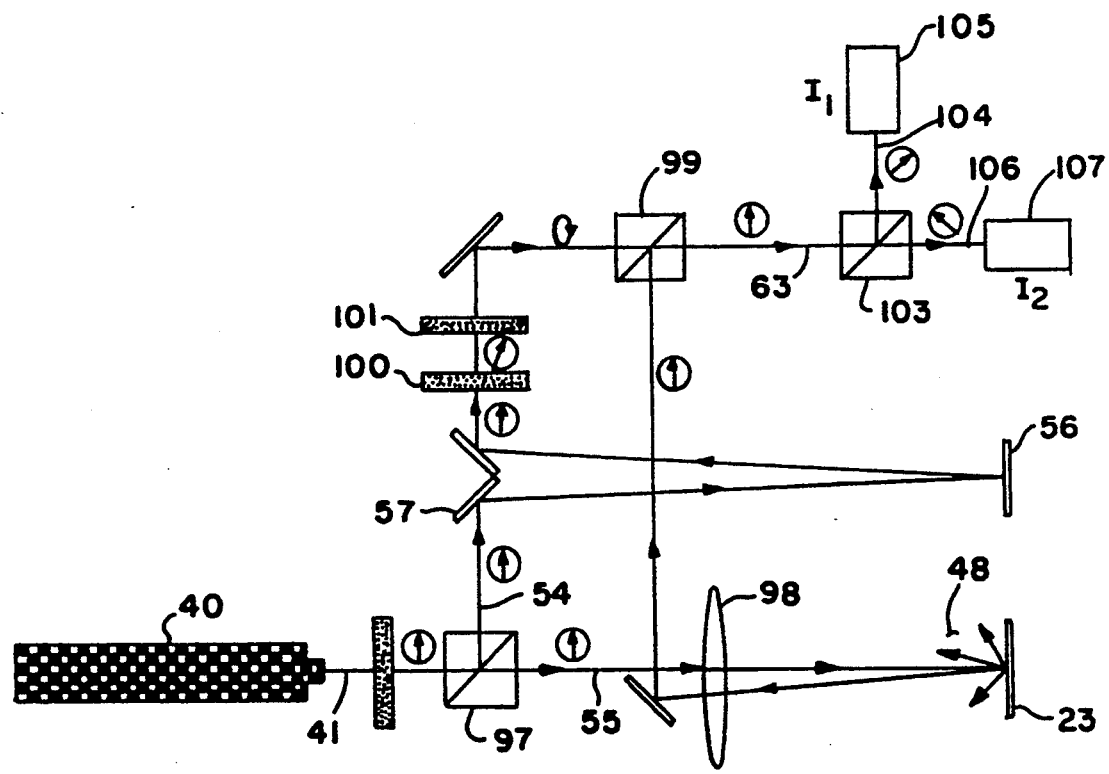
FIG. 6 is a schematic illustration of the components of an alternative embodiment of the interferometer of the present invention.
Figure 7:
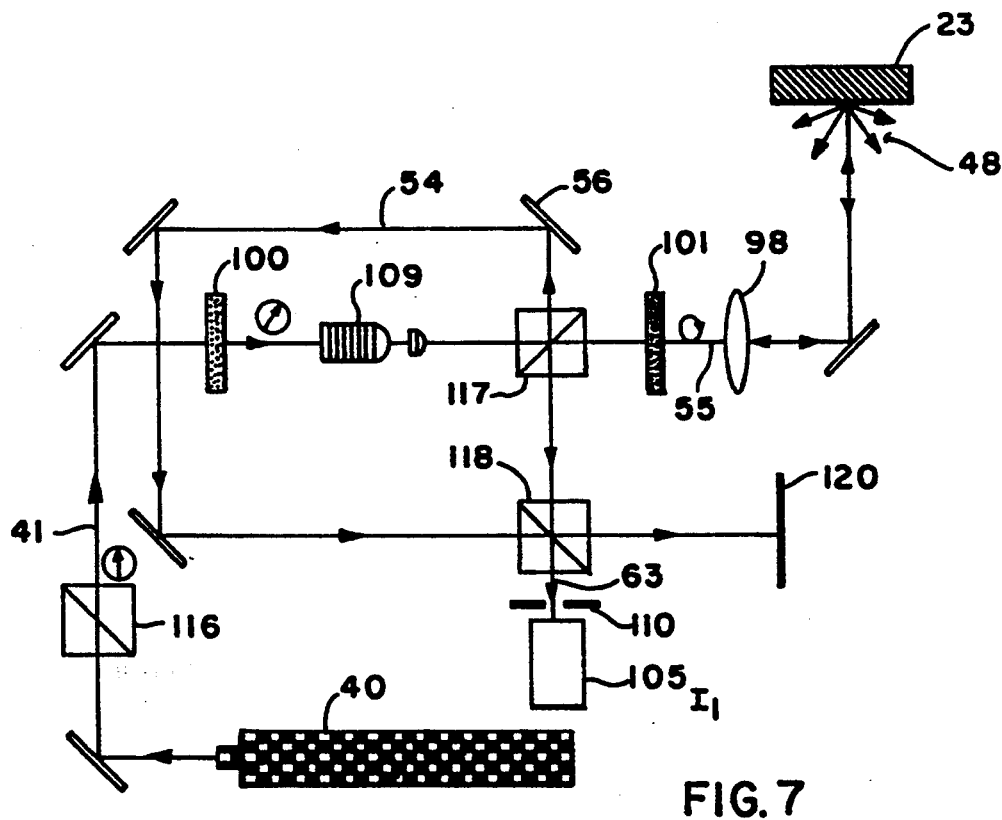
FIG. 7 is a schematic illustration of the components of the preferred embodiment of the interferometer of the present invention.

The interferometer system disclosed in FIG. 5 is simplified and improved upon in a cost reduction sense by the alternative embodiment disclosed in FIG. 6 which in turn is still further simplified and improved upon in a cost reduction sense by the preferred embodiment interferometer system disclosed in FIG. 7. It is also to be noted that the present invention evolved from the interferometer system disclosed in FIG. 5 to the improved upon system disclosed in FIG. 6 and finally to the preferred embodiment disclosed in FIG. 7, and while all systems disclosed in FIGS. 5, 6 and 7 measure phase-shifts in the signal beam the manner in which the phase-shift is measured is different, and conceptually different between the systems illustrated in FIGS. 5, 6 and 7.

In the interferometer system disclosed in FIG. 6, light source beam 41 from detecting laser 40 (or alternatively a strobe light) is linearly polarized by polarizer 96 and the linearly polarized light is split by a reflective beam splitter 97 into a signal beam 55 and a reference beam 54. Because of the opacity of workpiece surface 23 the intensity of light source 41 is split such that 95% of light source 41 travels as signal beam 55 while 5% of light source 41 comprises reference beam 54. This split could vary to 90%—signal beam and 10%—reference beam. Signal beam 55 is focused by means of lens 98 onto the surface of workpiece 23 and then to a non-polarizing beam combiner 99. The reference beam 54 travels along an adjustable mirror 56, 57 path to a half wave plate 100 where its plane of polarization as shown by the polarization symbol in FIG. 6 is retarded and then reference beam 54 passes through a quarter wave plate 101 whereby reference beam 54 is elliptically polarized. Elliptically polarized reference beam 54 and linearly polarized signal beam 55 are combined in non-polarizing beam combiner 99 to produce a circularly polarized resultant beam 63. Resultant beam 63 thus comprises a circularly polarized reference beam 54 and a linearly polarized signal beam 55 and the resultant beam is then split by a 45° polarizing beam splitter 103 into two orthogonal polarizations, namely a first beam 104 the intensity of which is measured by first photon multiplier 105 (could also be a photodiode), and a second beam 106 the intensity of which is measured by second photon multiplier 107 (could also be a photodiode). This action leads to a 90° phase difference between the two orthogonal polarizations of the reference beam which was circularly polarized before the beam combiner 99. No phase-shift between orthogonal polarizations takes place for linearly polarized signal beam 55 only. Any phase change between signal beam 55 and reference beam 54 will change the distribution of light intensity between first and second photon multipliers 105, 107 and hence provide a signal. The phase changes will occur if the target or workpiece surface moves due to the arrival of ultrasonic waves at the beam impingement point.

Figure 10:
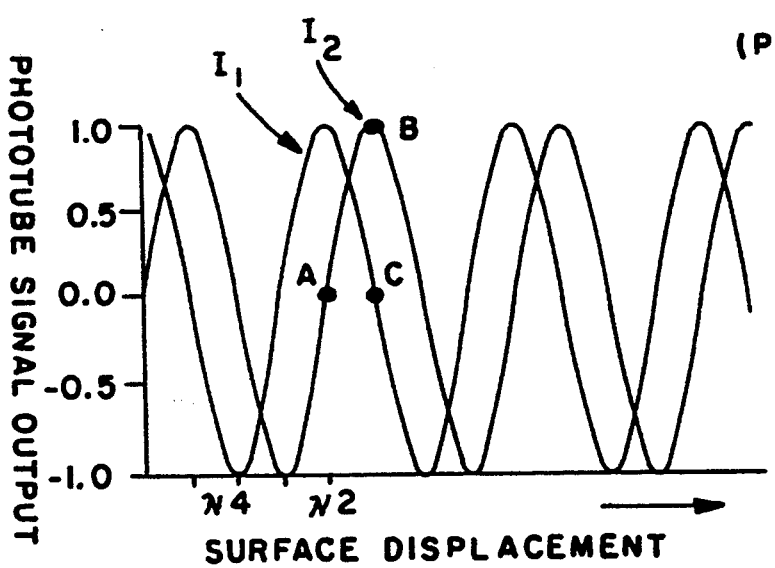
FIG. 10 is a graph showing the intensity of the photon multiplier electrical signal output on the "Y" axis and the difference in length between signal and reference beam paths or surface displacement on the "X" axis.
Figure 11A:
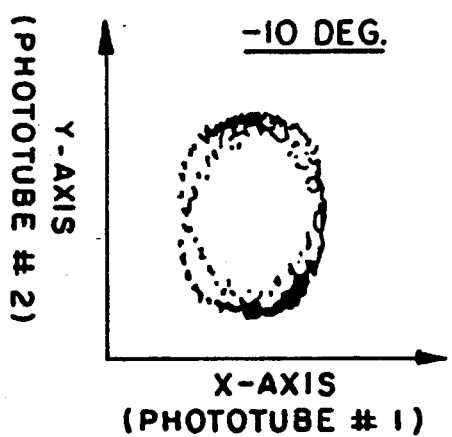
FIGS. 11A, 11B, 11C and 11D are "X-Y" oscilloscope displays similar to FIG. 11 but with the axis of the half-way plate rotated as indicated.
Figure 11C:
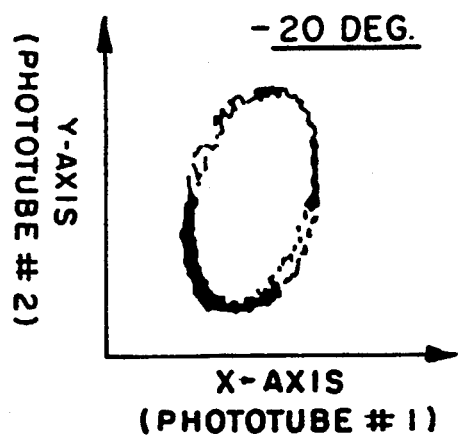
Figure 11B:
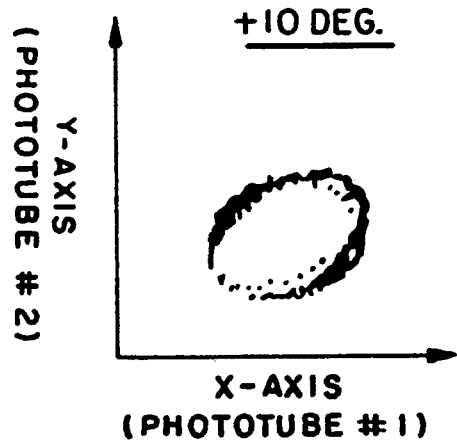
Figure 11D:
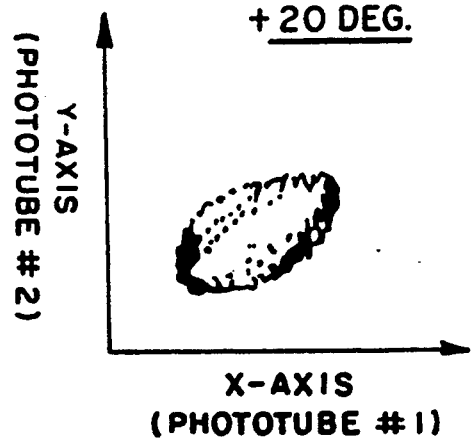

FIG. 10 is a graph of a photon tube signal output plotted on the "Y" axis and the surface displacement plotted on the "X" axis, i.e. the difference in length between reference beam path and signal beam path. In verifying the interferometer design of the invention, a round glass wheel with pie shaped sectors having various wedge angles (thickness) was inserted into the path of signal beam 55 between lens 98 and workpiece 23 so that the optical path of signal beam 55 would be altered a known distance equal to the wedge angle of each pie shaped sector as the glass wheel rotated in the path of the signal beam with intersections between adjacent pie shaped sectors clearly indicated by "blips" in the signal output trace. FIG. 10 is an idealized view of a portion of the signal output trace generated for a portion of one pie sector of the glass wheel (peaks not being shown). Each complete cycle in the signal output (which as noted above is a cosine wave) corresponds to a displacement of one wave length (for He-Ns light, this is 632.8 nm) and by counting the number of cycles very precise quantitative information for the thickness change in each pie sector can be obtained. Obviously the steeper the wedge the more number of cycles and the verification test established excellent agreement with static conventional interferometer tests verifying the thickness of each pie shaped sector. Also, as the speed of the glass wheel increased the amplitude of the cosine curve decreased and is an indication of the frequency response. Thus, absolute quantitative information can be determined from the output of either photon multiplier 105, 107. Importantly, the photon multiplier signal output curve of FIG. 10 shows that the cosine signal output generated from photon multiplier 105 lags 90° behind the cosine signal output generated by second photon multiplier 105. Now referring to the discussion above, there is a maxima and a minima at which the sensitivity of any one of the photon multiplier signals is maximized or minimized. If the system is operated for example at a point or time where second photon multiplier 107 signal is at point "A" a maximum sensitivity signal is obtained. If on the other hand the system is operated so that second photon multiplier 107 output signal is at a peak value of the cosine curve, such as at point "B" the signal is no longer sensitive to small displacement changes. Because first photon multiplier 105 is shifted in phase 90° relative to second photon multiplier 107, then, as shown by the curve in FIG. 10 should second photon multiplier 107 be at point "S", a condition of limited sensitivity in small displacement changes, then first photon multiplier 105 will be at point "C" a condition which is maximally sensitive to displacement changes. Thus, second photon multiplier solves the problem of sensitivity and also permits the system to operate as an interferometer per se since the system is always sensitive to phase change no matter what the particular mode of operation. In addition, the use of a second photon multiplier will account for any variation in sudden intensity changes in the light source beam although it should be noted that intensity changes in the light source beam will constitute "in phase" changes which the system will to some extent automatically correct therefore since any change in light source beam intensity will appear also in the reference beam and the system is measuring only the relative phase shift between the reference and the signal beam. Thus, while there are benefits to the use of two photon multipliers, it is one of the underpinnings of the present invention that only one photon multiplier need be employed.

Figure 11:
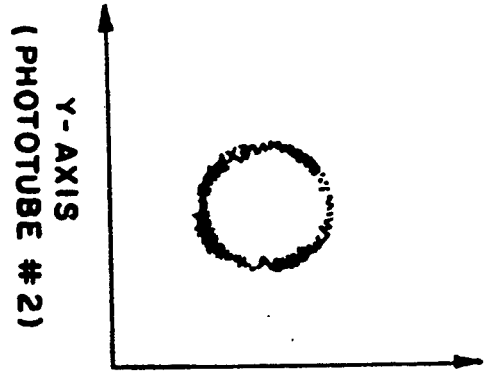
FIG. 11 is a reproduction of a display of an "X-Y" mode oscilloscope of a combination of two 90° apart electrical signals from the two photon detectors shown in FIGS. 6 and 8.

Referring now to FIGS. 11, 11A, 11B, 11C, and 11D, there is illustrated a display of an X-Y mode oscilloscope in which the "X" axis represents the signal from one of the photon multipliers 105 and the "Y" axis represents the signal of the other photon multiplier 107. When the system is properly aligned so that the intensity of the electrical signals i.e. $i_1$ and $i_2$ are equal then the two signals will form a circle as shown in FIG. 11. This indicates that the signals are exactly 90° out of phase. A signal is formed because of random vibrations at low frequency. No such circular signal is generated when the system is resting in an absolute calm environment and, in that case, a single point (not a circle) in the X-Y plane represents the signal. In the alternative embodiment discussed above in connection with FIG. 6 and, for purposes of obtaining absolute measurements, circularly polarized light is to be generated in resultant beam 63 since otherwise, polarizing beam splitter 103 will not produce projections shifted in phase 90° to one another. It was determined that because of less than perfect optical performance occurring in interferometer optical components such as the beam combiner, the polarizer etc. that circularly polarized light produced by quarter wave plate 101 would undergo elliptical distortion and the output signals resulting from photon multipliers 105, 107 would not necessarily be shifted 90° in phase. Investigation revealed that insertion of half wave plate 100 would retard the plane of polarization resulting in elliptically polarized light leaving quarter wave plate 101 so that the optical distortion produced by the other elements in the beam path would, in effect, correct the ellipticity of the resultant beam so that it is circularly polarized when it is split into its orthogonal projections. More specifically, it was found that by rotating the axis half wave plate 100 the degree of ellipticity produced in reference beam 54 could be precisely controlled. This is shown by the oscilloscope traces illustrated in FIGS. 11A, 11B, 11C, and 11D in which the axis of half wave plate 100 is rotated so that the plane of polarization was retarded by $-10°$ in FIG. 11A, $-20°$ in FIG. 11C, $+10°$ in FIG. 11b and $+20°$ in FIG. 11d. Thus, in the alternative embodiment disclosed in FIG. 6 the system is set up by shifting the axis of half wave plate 100 to produce elliptically polarized light in reference beam 54 to result in circularly polarized light in resultant beam 63 so that photon multipliers 105, 107 record electrical signals equal to one another and shifted in phase 90°.

Figure 8:
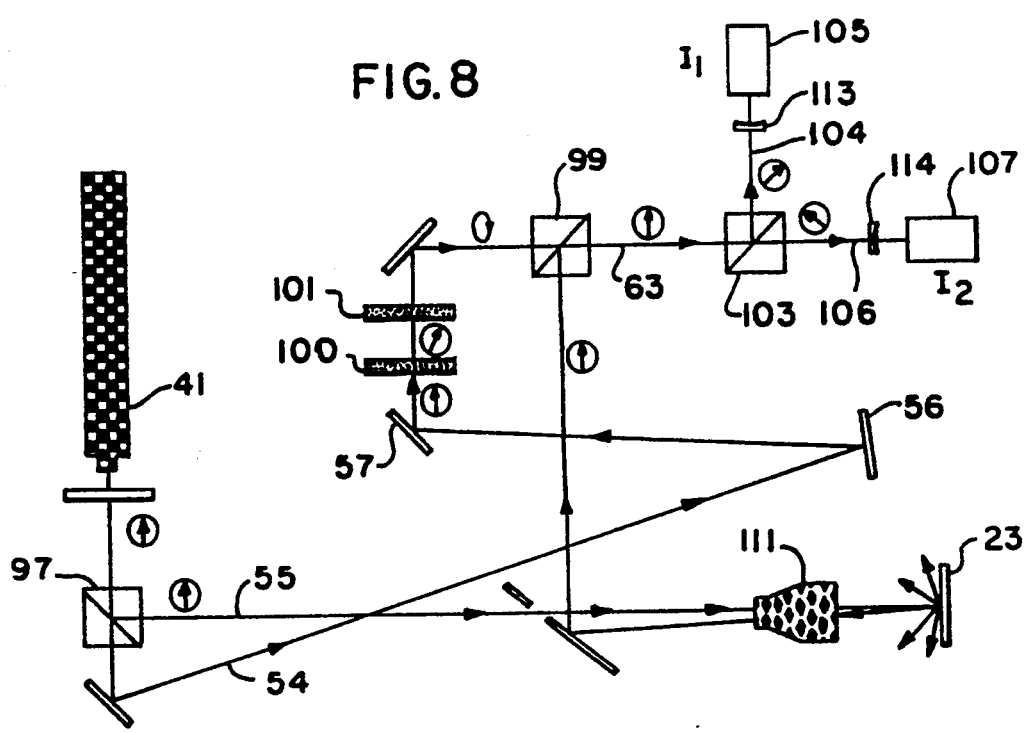
FIG. 8 is a schematic illustration of the components of the interferometer of the present invention modified to account for speckle pattern resulting from diffusive surfaces of the workpiece.
Figure 9:
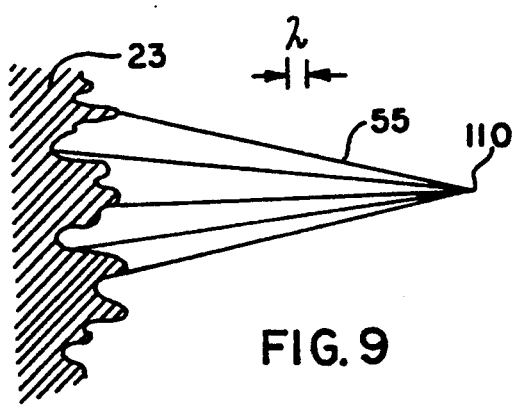
FIG. 9 is a schematic illustration of the formation of speckle phenomena from a diffusive workpiece surface.

Referring now to FIGS. 8 and 9, all surfaces of any workpiece 23 have a roughness as indicated in FIG. 9 which is depicted in scale reference in distance to that of a wave length of light. When nearly monochromatic light is reflected from such a surface, the optical wave resulting at any moderately distant observation point 110 consists of many coherent components or wavelets, each arising from a different microscopic element of the surface. With reference to FIG. 9, the distances travelled by these various wavelets may differ by several or many wave lengths if the surface is truly rough. Interference of the dephased, but coherent wavelets results in a granular pattern of intensity that is commonly referred to as "speckle". This peculiar granular appearance or speckle pattern of an object viewed in highly coherent light results in a granularity or speckle patent pattern which bears no obvious relationship to the macroscopic properties of the illuminated object but rather appears chaotic and unordered with an irregular pattern that is best described by the methods of probability theory and statistics. The modification to the interferometer of the present invention to accommodate the speckle pattern is based on the recognition that each speckle or light colored grain in the speckle pattern in resultant beam 63 contains an interference pattern indicative of the phase-shift between signal and reference beams 55, 54. The addition to the system of FIG. 6 which accommodates the speckle pattern is shown in FIG. 8 to include a camera lens 111 (Cannon 100 mm focal length F2) which helps focus the beam onto a diffraction limited spot on the diffusive surface of workpiece 23. This focuses in on the speckle or light colored grains appearing in the granular speckle pattern. First expanding lens 113 is provided in the path of first polarized beam 104 and a second expanding lens 114 is provided in the path of second polarized beam 106 and expanding lens (−100 mm focal length) 113, 114 are focused so that only one speckle or grain is passed onto first and second photon multipliers 105, 107. This concept has proven effective to permit phase-shift measurements attributed to sound waves in workpieces having rough, diffusive surfaces.

Referring now to FIG. 7 a preferred embodiment of the interferometer of the present invention is disclosed which has the advantage of being less costly to manufacture than the systems disclosed in FIGS. 5 and 6 because, among other things, only one photon multiplier and corrective lens aperture is required. However, and perhaps more importantly, the system disclosed in FIG. 7 can be adjusted to maximize utilization of signal beam light such that detecting laser 40 could be replaced by a strobe light. In addition, the arrangement disclosed in FIG. 7 minimizes optic distortion.

In FIG. 7, light source beam 41 is linearly polarized in polarizing beam splitter 116 and the plane of polarization retarded by adjustable half-way plate 100 as discussed above. Source light 41 after passing through beam expander 109 including a focusing lens passes through polarizing beam splitter 117 where it is split into a linearly polarized reference beam 54 having a retarded plane of polarization and a signal beam 55 focused by lens 98 onto workpiece 23. Signal beam 55 passes through a quarter wave plate and on its return is elliptically polarized over that portion of its beam path prior to becoming linearly polarized when it passes again through polarizing beam splitter 117. Other equivalent arrangements can use an eighth wave plate. Linearly polarized signal beam 55 and linearly polarized reference beam 54 are then combined in a non-polarizing beam splitter or combiner 118 into resultant beam 63 which passes through adjustable aperture 110 to focus on photon multiplier 105 to develop the electrical signal $i_f$ discussed above. By varying the plane of polarization through half way plate 100, the ellipticity of signal beam 55 is likewise altered so that when it returns through polarizing beam splitter 117 its linear plane of polarization can be established to increase the intensity or to sensitize the intensity of resultant beam signal 63. This of course results in a decrease in intensity of orthogonal signal leaving non-polarizing beam splitter 118 which strikes set-up screen 120. Further, if a second photon multiplier 107 were substituted for screen 120 so that absolute measurement changes could be obtained, then half wave plate 100 would be adjusted in the manner described for FIG. 6 to produce two equal intensity beams from beam splitter 118. In FIG. 7, a beam expander 109 (Newport Model LCl) in combination with focusing lens 98 increases the size of the granular pattern or speckle and adjustable aperture 110 (NRC IRIS) is adjusted so that only one speckle or grain is passed through to first photon multiplier 105.

Figure 13:
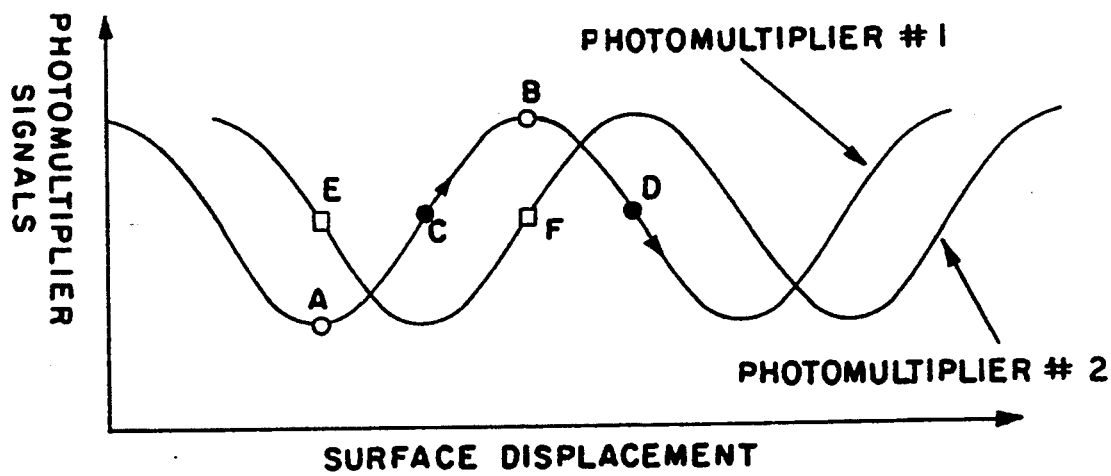
FIG. 13 is a plot showing surface displacement versus photon multiplier signal for two photon multipliers sensing light in a resultant beam which are 90° apart or 90° shifted in phase.

Referring now to FIG. 13 there is shown a plot of photon multiplier signal on the "Y" axis versus surface displacement on the "X" axis for two photon multipliers sensing light in a resultant beam which are 90° apart or 90° shifted in phase. These curves represent response curves to low frequency external or environmental vibrations imparted to workpiece 23. As with FIG. 10, the points A, B, C and D on the curve for photon multiplier no. 1 represent different operating points of the interferometer system disclosed in FIG. 6 or 7. If the interferometer happens to be at points A or B then its sensitivity is close to zero since any deviation (due to surface displacement) from these points will not produce any change in the photon multiplier signal i.e. "Y" axis change. On the other hand, at points like C and D, the sensitivity is maximum and small surface displacements lead to large photon multiplier signals. In practice, the ultrasound waves are a small high frequency ripple which are superposed on the large, slow vibrations reflected in the curve shown. It is points like C and D that make the signal fluctuate as described hereafter. This action is shown by the arrows at C and D in FIG. 13. If the system operates at C then a small displacement would generate a positive signal, while if the system operates at point D, a similar displacement will lead to a negative signal. The choice of operating point is purely random and cannot be predetermined in an environment with unavoidable external vibrations. At the same time however because of the external vibrations, the operating point of the interferometer will vary over a number of signals which can then be conditioned through a signal conditioning scheme which will be shortly described. On the other hand, the use of a second photon multiplier can avoid the problem of low sensitivity points A and B since those points correspond to the high sensitivity points E and F of the second photon multiplier. Thus, a smart software package can be implemented which would switch from one photon multiplier to the other and always pick that photon multiplier with high sensitivity reading. This is a specific advantage of the interferometer system disclosed herein over conventional interferometers where the detector must always be at points C and D for high sensitivity.

In the current system, only one photon multiplier is needed because a signal processing technique has eliminated the problems discussed above. The general processing scheme is conceptually illustrated in FIGS. 16A, B and D and schematically illustrated in block form in FIG. 16E. Referring first to FIG. 16E, a conventional triggering circuit 121 (such as a Schmidt trigger) controls the firing of impulse laser 24, which as noted varies its impulse position on workpiece 23 so that the same spot is not consistently impinged, and this in turn may result in a correlating adjustment by detection laser 41. As noted above a portion of the beam of impulse laser 24 is directed to a fast response photon multiplier 26, such as a type RCA 4526, which in turn establishes a reference start time and signals photon multiplier 105 RCA 4526 (could also be a photodiode such as United Detector Technology Model No. PIN-10 DP) to record the electrical signal. The electrical signal is digitized in an analog to digital device 122, squared at 123, summed at 124 and then averaged at 125. Its output 127 is then fed into an oscilloscope and from there into central processing unit 16. The electrical circuitry for performing these functions does not per se form part of the invention, and the circuitry to perform such functions as described is believed well within the scope of a skilled electrical technician or engineer and thus is not shown or described in detail. Graphically the signal conditioning scheme is shown in FIGS. 16A–D. FIG. 16A corresponds to the pulse signal recorded at point C in the graph of FIG. 13 and FIG. 16B shows the negative pulse signal recorded at point D in the graph shown in FIG. 13. If the signals are simply averaged no discernible signal will result as shown in FIG. 16C. However, if the signals are squared, summed and then averaged a truly average signal of the pulse of the sound wave over a fixed time span can be obtained as shown in FIG. 16D. However, it is contemplated that many installations will operate at only 32 or 16 pulses. The time over which the pulses are taken is a function of the frequency of impulse laser 24 and the speed of ultrasound waves. For example if laser 24 generates at 50 Hz, that is a 20 msec time interval between pulses, then the time-off-light must be less than 20 msec to avoid overlapping, confusion etc. A typical measurement of 128 pulses takes about 15 seconds and if the pulse number is reduced to 16 or 32, the processing time would be reduced to a couple of seconds. By processing and combining all of these pulses, the system avoids low sensitivity regions and achieves an excellent signal noise ratio. Again, it is a random external vibrations imparted to the workpiece which varies the points at which the interferometer operates so that a plurality of pulses can be square average to produce a truly accurate signal which permits time of flight as well as wave amplitude to be measured and correlated to other properties. This signal conditioning scheme is based on processing and combining a number of pulses typically as many as 128.

Figure 14A:
FIGS. 14A and 15A are electrical signal time traces of unprocessed photon multiplier signals and FIGS. 14B and B are processed time signal traces for FIGS. 14A, 15B respectively.
Figure 14B:
Figure 15A:
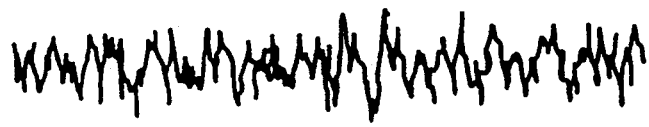

FIGS. 14A, 14B and 15A and 15B illustrate the signal conditioning arrangement discussed with reference to FIGS. 16A–E. The signals in FIGS. 14A, 14B and 15A and 15B were obtained on 1" thick mild steel samples at room temperature. In FIG. 15A the arrival of the ultrasonic wave cannot be detected in the unprocessed signal. This signal, i.e. FIG. 15A, represents a snap-shot of the data during a single ultrasonic wave pulse. However, when a number of pulses are acquired which were 128 for the sample illustrated, the signal appears in FIG. 15B with a dramatically improved signal noise ratio. FIG. 14A illustrates a snap-shot of a single wave pulse where the arrival of the wave can be detected without signal processing. In fact, it is possible, for reasons discussed above, to simply scan the sample of snap-shots and discard unacceptable readings such as FIG. 15A and average detectable unprocessed signals such as that discussed in FIG. 14A to arrive at a reasonably accurate time of flight average. However, when the signal conditioning scheme is applied even to detectable unprocessed signals such as shown in FIG. 14A, the process signal shown in FIG. 14B significantly improves the clarity of the signal. This improvement or clarity becomes especially important when more than one wave motion is being sensed.

The invention disclosed herein was initially developed to directly determine temperature measurement of workpiece 23 by determining time of flight of ultrasonic waves in the workpiece. FIGS. 17A, 17B and 17C illustrate the temperature effect on time of flight of ultrasound waves through 1" thick SAE Grade 8620 carbon steel with the time point of ultrasound generation to the left of the traces (not shown). FIGS. 17A–C show that the time of flight of the ultrasonic waves increases as the temperature rises and makes it possible to correlate the temperature of the workpiece to look up tables or to a base reference signal. Traces similar to those shown in FIGS. 17A–C apply to other metals. This permits the heat treat process conducted in the batch furnace 10 to be controlled by the temperature directly measured in the workpiece.

Figure 12A:
FIG. 12A is an electrical signal trace of a longitudinal and/or shear (surface) wave generated in a workpiece by an impulse laser and recorded by a piezoelectric transducer.
Figure 12B:
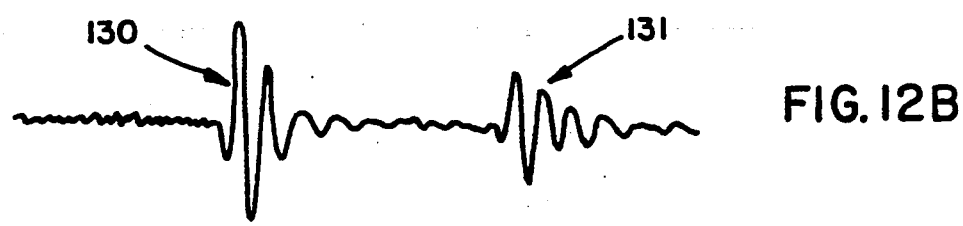
FIG. 12B is an electrical signal trace of a longitudinal and/or shear (surface) wave generated in a workpiece by a piezoelectric transducer and sensed by the interferometer of the present invention.

As noted at the outset, the temperature measurement is not limited to measurements of the bulk temperature of the workpiece or to measurements at the surface of the workpiece. FIG. 12A is an uncorrected signal recorded by the interferometer system disclosed in FIG. 6 or 7 of an ultrasonic wave generated by a piezoelectric transducer. The uncorrected photon multiplier's electrical signal clearly show the wave arrival with longitudinal and/or shear wave indicated by reference numeral 130 and the wave arrival point of shear waves indicated by reference numeral 131. FIG. 12B is the electrical signal trace developed by a piezoelectric transducer of an ultrasonic wave generated in a workpiece by impulse laser 24. Thus FIG. 12B demonstrates that an impulse laser can generate ultrasonic longitudinal and/or shear waves 130 and shear waves 131 which can be detected. Thus it is possible to simultaneously measure both the bulk temperature of the workpiece through longitudinal and/or shear wave time of flight analysis and also the surface temperature of the workpiece through analysis of the Rayleigh or surface wave time of flight movement such as by a laser/interferometer arrangement illustrated in FIG. 2B. Many heat treat processes require through heating of the workpiece to achieve desired metallurgical and physical properties. As noted above, the present practice is to simply allow the workpiece to equilibrate to the desired temperature over a predetermined time which requires maintaining the heat throughput for time periods longer than that which is metallurgically required. Thus with the invention it is possible to precisely determine when equilibration occurs to reduce the overall process time or alternatively to ramp the furnace temperature to a higher temperature to achieve the bulk temperature in a shorter time period.

Figure 22:
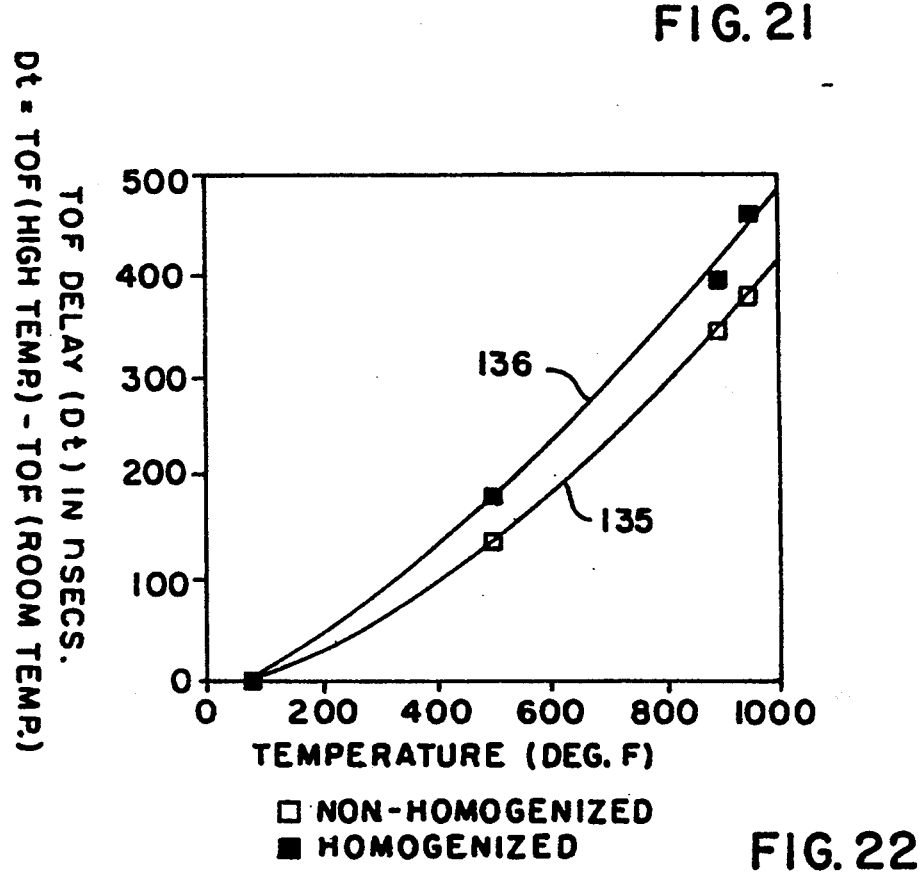
FIG. 22 is a graph of sound wave speed in homogenized and non-homogenized aluminum at various temperatures.
Figure 23:
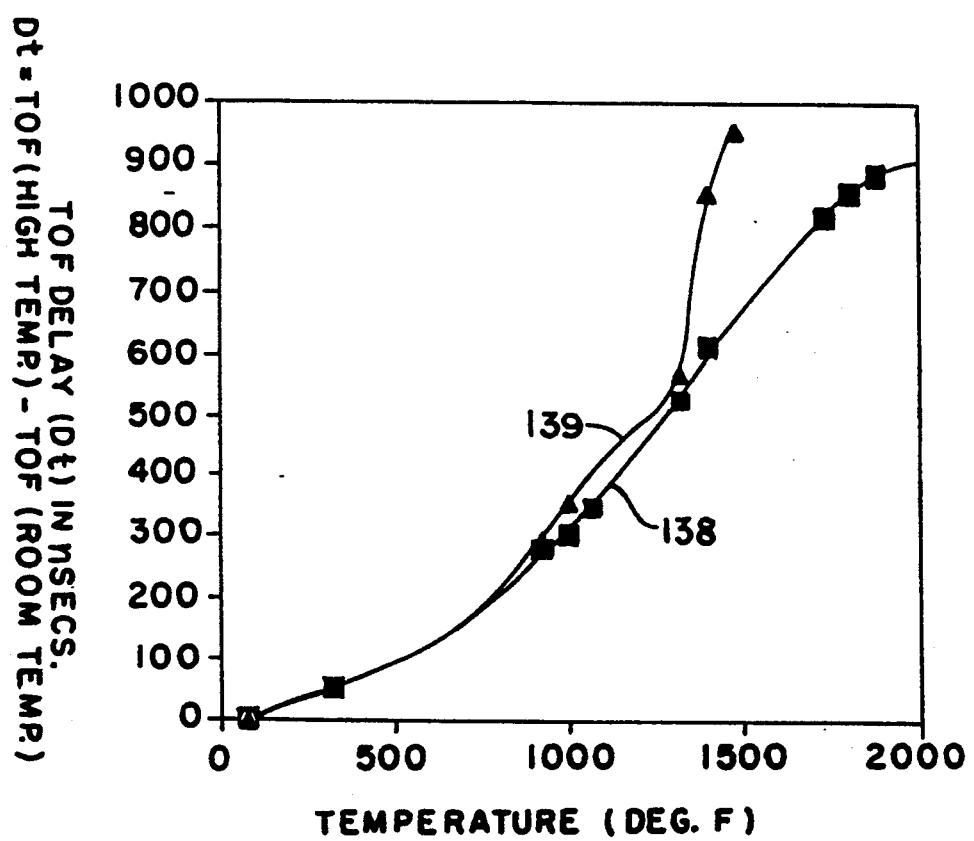
FIG. 23 is a graph of sound wave speed in carburized and non-carburized steel plate.

As discussed above, it is intended that the invention not only measure temperature but also physical and metallurgical characteristics of the workpiece. That this can be accomplished is illustrated first in FIG. 22 which plots time of flight measurements recorded by the invention for non-homogenized 1" aluminum 6061 bars as shown by line 135 and homogenized 1" aluminum 6061 bars as shown by line 136. The difference between graphs 135, 136 is attributed to the degree that the aluminum has been homogenized. To a similar effect is FIG. 23 which shows time of flight delay as a function of temperature for 8620 carbon steel in an as received condition indicated by graph 138 and for 8620 carburized steel indicated by graph 139. FIGS. 22 and 23 demonstrate that the heat treat process depicted by the curves i.e. homogenizing and carburizing can be controlled by a "signature profile" control scheme. Reference should be had to Surface Combustion patent 4,193,069 for discussion of process control by heat signature profiling, and U.S. Pat. No. 4,193,069 is incorporated by reference herein in this respect. A similar technique would be employed to effect process control in the present invention in that a time of flight profile or operating curve would be programmed into central processing unit 16 which would be correlated to the graphs in FIGS. 22 and 23. Gas control 13 would then be regulated i.e. heat input and furnace gas composition, so that the time of flight measurements maintain the profile of the signature time of flight graph programmed into the central processing unit. Prior to start of the process, initial time of flight measurements on the workpiece would be taken for calibration purposes relative to the signature profile or imprinted into the central processing unit. Again, since the time of flight measurement is an exact measurement, what the workpiece experiences during the process is controlled directly by the properties and temperature actually existing within workpiece 23.

It is also within the scope of the present invention to control heat treat processes in which the metal undergoes phase transformation. As of the date of this application investigation of wave characteristics sensed by the interferometer system disclosed herein is continuing but initial investigations indicate that the system has ability to detect phase transformations and control heat treat process accordingly. In this connection, initial investigations have been limited to time of flight measurement, but it is contemplated that actual measurement of the sound pulse movement i.e. two photon tubes in the system disclosed in FIG. 7 may conceptually be employed to provide additional indicia i.e. wave amplitude as well as wave speed for process control. However, it is believed that time of flight measurements and signal conditioning schemes will be sufficient to distinguish phase transformation.

As an example of one practical application of this concept reference may be had to FIGS. 18 and 19. FIG. 18 is a graph of an aluminum-copper equilibrium diagram. Solution treatment of aluminum-copper alloy containing about 5% copper is depicted in FIG. 18 and it should be noted that along line 140, the temperature band for a single phase (k) solid solution is narrow and the temperature in this narrow band (+5° F.) must be closely controlled to achieve uniform bulk temperature of the workpiece if product quality must be achieved. Since the invention can measure surface and bulk temperature, excessive soak time can be eliminated from the process cycle time resulting in increased productivity. FIG. 19 are pictures or representations of grain structure for age hardening of aluminum i.e. see FIG. 18. In the metallurgical process termed age hardening or precipitation hardening, an aluminum alloy is initially heated to form a single phase solid solution i.e. grain pattern "A" shown in FIG. 19. It is then quenched so that the solid solution is retained i.e. grain pattern "B" and reheated i.e. annealed to form grain boundary precipitate i.e. grain pattern "C". The metal is then held at this intermediate temperature whereat age hardening or sub-microscopic precipitation starts i.e. grain pattern "D". The time of age hardening temperature is a critical factor. Insufficient time does not achieve desirable hardness properties and too much time at age hardening temperature causes the alloy to soften due to growth of participate particles i.e. grain pattern "E". It is believed that the ultrasonic wave patterns produced in the granular structures indicated as "B", "C", "D" and "E" in FIG. 19 will vary and will permit direct control of the process as a function of the precipitate hardening.

Figure 21:
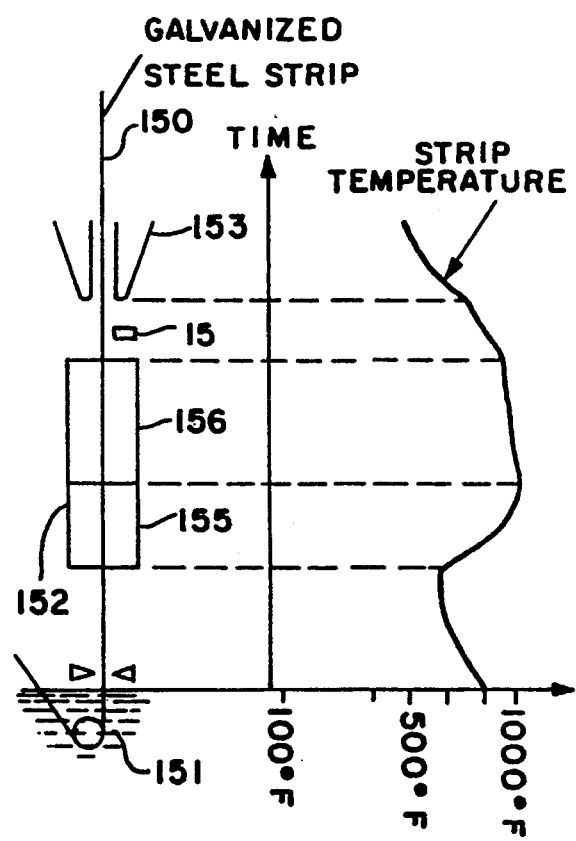
FIG. 21 is a schematic view of a galvanneal strip line with corresponding strip temperature profile.

FIG. 1 illustrates a batch type industrial process. FIG. 21 illustrates workpiece analyzer 15 applied to a strip line and more particularly to a galvanized strip line 150. This strip line performs a galvannealing process which is a transformation of a zinc coating into an alloyed coating consisting of various iron-zinc alloy phases. In order to obtain a ductile coating without powdering, brittle phases in the iron-zinc phase diagrams should be limited. Various parameters such as aluminum content of the coating, processing temperature and time, coating thickness, etc. need to be considered for controlling the system. Galvannealing is a continuous process with a typical processing rate of about 50 tons/hour and process temperature ranges from 850°–1100° F.

In a galvanneal system incoming strip passes through a molten zinc pot 151 then through a furnace 152 for heating and finally a cooler 153. Strip 150 gets coated with a thin layer of zinc in zinc pot 151 and when it passes through furnace 152 the zinc transforms into various alloys with iron. Furnace 152 has a heating zone 155 and a holding zone 156 to provide adequate time for diffusion of iron into zinc for transformation reactions. Typical residence time for the strip in holding zone 156 is about 15 seconds. After the strip is soaked a desired time, the strip is cooled in a cooling zone 153 to a temperature below 750° F. so that the strip can come into contract will mill rollers (not shown) which guide the strip. The heating process is intended to cause a diffusion of the iron in the base metal through the zinc coating and results in a matte surface finish which is more desired for painting than standard galvanized coating surface.

Alloy coatings present a dull surface texture which readily takes paint but the alloy must be uniform so that no brighten unalloyed regions remain. At the same time, over alloying must be avoided. Thus time and temperature control play a significant role in the galvanneal process. Presently, sophisticated computer algorithms are used to set these parameters. The emissivity of bright zinc coating is low but emissivity of low alloyed coating is high and therefore radiation pyrometers are not suitable for temperature measurement and contact thermocouples cannot be used for this application because of surface damage. The transition band from bright zinc coating to a dull alloyed coating is narrower in length and fluctuates along the length of the strip. At present, this problem is addressed by visual observation of the band by an operator and adjusting the operating parameters manually which requires constant operator attention. The workpiece analyzer 15 positioned as shown is ideal for control of this application because it is not affected by strip emissivity. More particularly, strip control by workpiece analyzer 15 will permit an increase in the heating rate in the heating zone 155 with the result that the height of heating zone 155 can be reduced with an overall reduction of the overall height of the line. Decreasing the line height reduces the length of the unsupported strip which reduces clearance requirements around the strip and the amount of cold air entrained within the strip thus producing better product while permitting faster line speed. Similar considerations apply to other strip line processes such as annealing of sheet steel.

Figure 20:
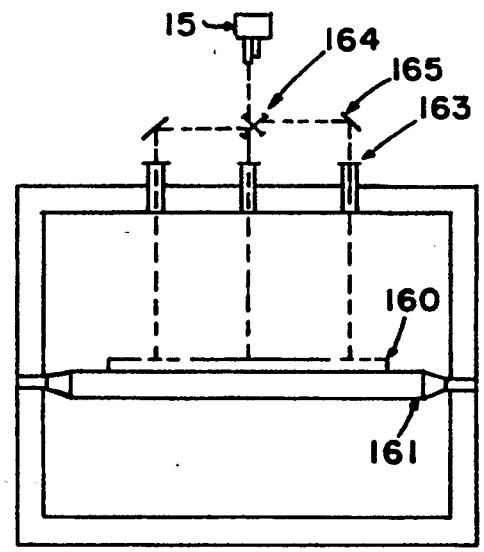
FIG. 20 is a schematic illustration of a mirror arrangement for taking multiple measurements of metal billets or slabs.

In addition to the batch heat treating processes performed in the batch furnace of FIG. 1 and the strip line heat treating applications such as disclosed in FIG. 21, there are also continuous or semi-continuous processes in which slabs, billets and the like are heated or reheated in elongated furnaces, a cross-section of which is illustrated in FIG. 20. In such furnaces, a metal slab 160 rests on furnace rolls 161 while it is heated from above and below and conveyed through various furnace zones in which the furnace atmosphere and temperature is closely controlled. Uniformity of the heat inputted to the slab from side to side is critical and FIG. 20 illustrates an application where one workpiece analyzer 15 using a FIG. 2B mount can measure the temperature of the slab 160 from side to side. In the arrangement depicted several sight ports 163 are provided in the top of the furnace and a rotating mirror 164 directs the impulse laser and detector laser beams either through the center sight window or by means of fixed mirror 165 through one or the other end sight ports 163. Thus one workpiece analyzer 15 can be employed to scan transverse temperature measurements across slab 160.

The invention has been described thus far with specific reference to control of industrial heat processes in which temperature of the workpiece plays a particularly critical role in process control. The invention however is not limited to heat treat process control. Time of flight of sound waves varies through solids depending upon the metallurgical composition of the solid. Thus the workpiece analyzer can be used in countless installations to nondestructively test a manufactured part at ambient temperature to control the manufacturing process i.e. castings. Time of flight of sound waves also varies depending upon the soundness of integrity of the manufactured part. Workpiece analyzer can function to non-destructively test the soundness of any solid manufactured item for acceptance and rejection of the part. More specifically however workpiece analyzer is ideally suited to test manufactured items which are subjected to stresses from vibrations. That is, many industrial processes require the manufactured part to be subjected to external vibrations for life tests. Clearly, the workpiece analyzer has application with the significant benefit that the part does not have to be destroyed. Thus in the aircraft industry it is now possible for each part, such as turbine blades, helicopter rotors, loading gear assemblies, etc. to be thoroughly tested in a non-destructive manner.

The invention has been described with reference to a preferred embodiment and alternative embodiments. Further alterations and modifications to the invention will become obvious to those skilled in the art upon reading and understanding the specification hereof. It is intended to include all such modifications and alterations in so far as they come within the scope of the invention.

Having thus defined the invention, it is claimed:

1. Apparatus for measuring surface movement of a solid object subjected to external random vibrations comprising:
    a) means for generating a plurality of pulse waves in said object causing a surface movement thereof;
    b) optical homodyne interferometer means for generating from a source light beam at least a reference light beam and a signal light beam for impinging on said object, said reference light beam and a portion of said signal light beam that impinges on said object being combined in a resultant beam to produce an interference light pattern, said optical homodyne interferometer means having an operating point that is varied by a displacement of the surface due to the external random vibrations;
    c) photon detecting means associated with said interferometer means for generating an electrical signal indicative of the interfering light pattern produced for each pulse wave;
    d) means to square a detected value of each electrical signal for each of said plurality of pulse waves and;
    e) means to sum said squared values and to average said summed squared values to produce a resultant signal that is correlated to the movement of the surface of said object caused by said pulse waves and to also compensate for said variation in said operating point that is caused by said external random vibrations.

2. The apparatus of claim 1 wherein said pulse waves are sound waves.

3. The apparatus of claim 1 wherein said source of light is comprised of a laser that emits substantially monochromatic light.

4. The apparatus of claim 1 wherein said reference beam traverses a reference beam path, wherein said signal beam traverses a signal beam path, and wherein said reference beam path and said signal beam path are, to within a coherence length of said source light beam, approximately equal in optical length.

5. The apparatus of claim 4 wherein said optical interferometer means includes means for linearly polarizing said source light beam and means for causing a phase-shift in one of said signal and reference beams, at least for a portion of its path, to produce said interference light pattern.

6. The apparatus of claim 5 wherein said means for causing said phase-shift includes means for generally elliptically polarizing at least said signal beam over at least a portion of its path.

7. The apparatus of claim 6 wherein said optical interferometer means further includes means for changing a plane of polarization of said source light beam before said resultant beam is formed.

8. The apparatus of claim 7 wherein said means for changing the plane of polarization includes a half wave plate and means for varying an axis of said half wave plate for controlling the polarized ellipticity of said signal beam whereby a distribution of relative magnitudes between said signal and reference beams is optimized.

9. The apparatus of claim 4 and further including means to synchronize a timing of the generation of said pulse waves with the operation of said photon detecting means whereby a pulse wave is not generated until said photon detecting means has generated said electrical signal for a previously generated pulse wave.

10. The apparatus of claim 1 and further including;
    focusing means for focusing said signal beam on a limited spot on said object to produce large speckle patterns indicative of the surface roughness of said object;
    said optical homodyne interferometer means including photon collecting means for sensing light photons of said resultant beam and for generating an electrical signal indicative of the photons sensed; and
    adjustable aperture means situated in the path of said resultant beam for focusing onto said photon collecting means a portion of said resultant beam light which encompasses substantially only one speckle pattern whereby the surface texture of said object does not interfere with the measurement of its surface movement.

11. A method for measuring surface movement of a solid object subjected to external random vibrations comprising the steps of:
   generating a plurality of ultrasound waves in said object for causing a movement of the surface thereof, the frequency of said external random vibrations being less than the frequency of said ultrasound waves;
   providing a polarizing interferometer and sensing surface movement of said object caused by said ultrasound waves, the polarizing interferometer having an operating point that is varied by a displacement of the surface due to the external random vibrations;
   providing a photon multiplier associated with said polarizing interferometer;
   generating an electrical signal from said photon multiplier for each ultrasound wave;
   squaring the intensity of each electrical signal;
   summing the squared intensities of all electrical signals; and
   selectively averaging the summed squared intensities to produce an average signal intensity that is substantially insensitive to noise interference and that is indicative of surface movement of said object attributed substantially only to said ultrasonic waves and not to the surface displacement caused by the external random vibrations.

12. The method of claim 11 wherein said polarizing interferometer uses a light source beam to measure said object's surface movement by including the steps of:
   i) splitting said light source beam into a reference beam and a signal beam;
   ii) directing said signal beam against said object in the vicinity of said sound wave and collecting scattered light from said object as a reflecting signal beam;
   iii) introducing a phase-shift by changing a state of polarization of one of said signal and reference beams;
   iv) combining said reference beam and reflecting signal beam into a resultant beam containing an interference light pattern; and
   v) sensing the intensity of said resultant beam by generating an electrical signal indicative of the intensity and phase-shift of the reflecting signal beam.

13. The method of claim 12 further including the step of retarding a plane of polarization of said light source beam prior to said reflecting signal beam and said reference beam being combined into said resultant beam whereby the circularity of generally circular polarized light is controlled to achieve an optimum light distribution.

14. The method of claim 12 further including the steps of:
   providing a lens in the path of said signal beam and focusing said lens so that said signal beam impinges at a discrete position on the surface of said object to produce a large, granular speckle pattern; and
   providing an adjustable aperture lens in the path of said resultant beam and adjusting the aperture of said adjustable aperture lens so that substantially only one speckle passes through said aperture for generating said electrical signal.

15. A method for measuring surface movement of a solid object that is subjected to external random vibrations, comprising the steps of:
   repetitively launching a plurality of acoustic waves within the object for causing a surface movement of the object, the surface movement being superimposed on a varying displacement of the surface due to the external random vibrations;
   for individual ones of the launched acoustic waves, detecting a magnitude of a total amount of surface movement due to the launched acoustic wave and to the external random vibrations;
   filtering out the displacement of the surface due to the external random vibrations by the steps of, squaring each of the detected magnitudes; summing the squared detected magnitudes; and averaging the summed squared detected magnitudes to produce a resultant signal that is expressive of the surface movement of the object due only to the launched acoustic waves; and
   correlating the resultant signal to at least one property of the object.

16. A method as set forth in claim 15 wherein the property is a temperature of the body.

17. A method as set forth in claim 16 wherein the property is a metallurgical characteristic of the body.

18. A method as set forth in claim 15 wherein the step of launching includes a step of operating a laser to strike a surface of the object with a pulse of electromagnetic energy.

19. A method as set forth in claim 15 wherein the step of detecting includes the steps of:
   operating a homodyne single pass interferometer means for generating, from a source beam, a reference beam that traverses a reference beam path and a measurement beam that traverses a measurement beam path;
   directing at least a portion of the measurement beam to a surface of the object;
   collecting at least a portion of the measurement beam that reflects from the surface to form a return beam;
   combining the reference beam and the return beam; and
   generating an optical interference pattern from the combined reference and return beams, the optical interference pattern indicating a difference in path length between the reference beam path and the measurement beam path, the difference in path length being due at least to the movement of the surface in response to one of the plurality of launched acoustic waves, the movement being superimposed on the displacement of the surface due to the external random vibrations, wherein the step of detecting detects the optical interference pattern.

20. A method as set forth in claim 19 wherein the step of operating includes a step of phase shifting one of the reference beam and the measurement beam with respect to the other beam.

21. A method as set forth in claim 15 wherein the body is in motion during the execution of the steps of repetitively launching and detecting.

22. A method as set forth in claim 15 wherein the step of detecting directly detects a displacement of the surface without requiring a measure of a reflected signal that indicates a velocity, if any, of the surface.

* * * * *